United States Patent
Kim et al.

(10) Patent No.: US 11,575,821 B2
(45) Date of Patent: Feb. 7, 2023

(54) CAMERA DEVICE HAVING FIRST AND SECOND CAMERAS, AND METHOD OF OPERATING SAME

(71) Applicant: LG INNOTEK CO., LTD., Seoul (KR)

(72) Inventors: Min Kim, Seoul (KR); Jun Seok Oh, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 17/278,023

(22) PCT Filed: Sep. 19, 2019

(86) PCT No.: PCT/KR2019/012157
§ 371 (c)(1),
(2) Date: Mar. 19, 2021

(87) PCT Pub. No.: WO2020/060235
PCT Pub. Date: Mar. 26, 2020

(65) Prior Publication Data
US 2021/0352215 A1   Nov. 11, 2021

(30) Foreign Application Priority Data
Sep. 21, 2018   (KR) .................. 10-2018-0113873

(51) Int. Cl.
*H04N 5/232*   (2006.01)
*G02B 3/14*   (2006.01)
(Continued)

(52) U.S. Cl.
CPC ......... *H04N 5/232122* (2018.08); *G02B 3/14* (2013.01); *G02B 7/04* (2013.01); *H04N 5/2258* (2013.01); *H04N 5/23296* (2013.01)

(58) Field of Classification Search
CPC .......... H04N 5/232122; H04N 5/2258; H04N 5/23296; G02B 3/14; G02B 7/04
See application file for complete search history.

(56) References Cited

U.S. PATENT DOCUMENTS 5,486,860 A   1/1996   Shiokawa et al.
8,836,767 B2*   9/2014   Endo .................... H04N 13/239
                                                              348/47

(Continued)

FOREIGN PATENT DOCUMENTS

CN   103535022 A   1/2014
CN   105007420 A   10/2015
(Continued)

*Primary Examiner* — Nicholas G Giles
(74) *Attorney, Agent, or Firm* — Birch, Stewart, Kolasch & Birch, LLP

(57) ABSTRACT

A camera device including first and second cameras, focal position information of the first camera and focal position information of the second camera are matched with each other. Also, the accuracy of the current focal position of the first camera is determined based on the phase difference of images obtained by the first camera when the first camera is auto-focused. Subsequently, when the accuracy of the current focal position of the first camera is low, an accurate focal position of the first camera is tracked by using the matched focal position information of the second camera. When an auto-focusing function of the first camera is activated, focal position movements are tracked by using the focal position information of the second camera as well as zoom tracking of the first camera, and thus, the accuracy can be improved.

20 Claims, 22 Drawing Sheets

(51) Int. Cl.
    *G02B 7/04*         (2021.01)
    *H04N 5/225*     (2006.01)

(56) References Cited

U.S. PATENT DOCUMENTS

| | | | |
|---|---|---|---|
| 9,313,390 B2 | 4/2016 | Velarde et al. | |
| 9,531,945 B2 | 12/2016 | Chen et al. | |
| 9,910,247 B2 | 3/2018 | Lee et al. | |
| 9,918,003 B2 * | 3/2018 | Inoue | G02B 7/285 |
| 10,382,665 B2 * | 8/2019 | Sa | H04N 5/23293 |
| 10,521,695 B2 | 12/2019 | Agashe et al. | |
| 10,694,126 B2 | 6/2020 | Lee et al. | |
| 2012/0154647 A1 * | 6/2012 | Endo | H04N 5/232123 |
| | | | 348/262 |
| 2012/0257065 A1 | 10/2012 | Velarde et al. | |
| 2016/0065833 A1 | 3/2016 | Chen et al. | |
| 2016/0134802 A1 * | 5/2016 | Inoue | H04N 5/232123 |
| | | | 348/349 |
| 2017/0212327 A1 | 7/2017 | Lee et al. | |
| 2018/0191947 A1 * | 7/2018 | Sa | H04N 5/23267 |

FOREIGN PATENT DOCUMENTS

| | | |
|---|---|---|
| CN | 105376474 A | 3/2016 |
| CN | 105847693 A | 8/2016 |
| CN | 106534696 A | 3/2017 |
| CN | 108270967 A | 7/2018 |
| CN | 108463993 A | 8/2018 |
| JP | 6249636 B2 | 12/2017 |
| KR | 10-0135733 B1 | 4/1998 |
| KR | 10-2012-0071279 A | 7/2012 |
| KR | 10-1390196 | 4/2014 |
| KR | 10-1573590 B1 | 12/2015 |
| KR | 10-2016-0115682 A | 10/2016 |
| KR | 10-2017-0133408 A | 12/2017 |
| KR | 10-2018-0078596 A | 7/2018 |

* cited by examiner

[first zoom magnification]

[second zoom magnification]

[Mth zoom magnification]

CAMERA DEVICE HAVING FIRST AND SECOND CAMERAS, AND METHOD OF OPERATING SAME

CROSS REFERENCE TO RELATED APPLICATIONS

This application is the National Phase of PCI International Application No. PCT/KR2019/012157, filed on Sep. 19, 2019, which claims priority under 35 U.S.C. 119(a) to Patent Application No. 10-2018-0113873, filed in the Republic of Korea on Sep. 21, 2018, all of which are hereby expressly incorporated by reference into the present application.

TECHNICAL FIELD

An embodiment relates to a camera device, and more particularly, to a camera device capable of performing an autofocus function (AF) of a first camera by using focal position information of a second camera.

BACKGROUND ART

Portable devices such as smartphones, tablet PCs, and laptops have built-in camera modules, and these camera modules have an auto focus (AF) function that automatically adjusts a distance between an image sensor and a lens to align a focal length of the lens.

Recently, camera modules have a zooming function of zooming up or zooming out, which increases or decreases the magnification of a distant subject through a zoom lens. The camera module includes a zoom lens and a focus lens, a zoom actuator for moving the zoom lens, a focus actuator for movement of the focus lens, a driver for controlling the zoom actuator and the focus actuator, and a storage for storing location information of the zoom lens and the focus lens.

The camera module having the zooming function as described above should automatically focus according to the change of the zoom magnification. However, when the zoom magnification of the zoom lens increases, strokes of the zoom actuator and the focus actuator lengthens, and accordingly, there is a problem in that the speed of auto focus is slowed.

Accordingly, recently, calibration data is stored in the storage as described above, and the zoom lens and focus lens of the camera module are moved using the calibration data to speed up the auto focus.

At this time, in order to provide the above function, calibration data corresponding to a focus range according to all zoom arrangements must be stored in the storage. However, the focus range is classified according to the distance to the object (eg, Macro and Infinity). Accordingly, in the related art, it is necessary to store both the position value of the zoom lens and the data of the position value of the focus lens according to all distances as described above in the storage, and accordingly, there is a problem that the manufacturing cost increases due to an increase in memory size.

In addition, in the manufacturing process of the camera module, there is a limitation in measuring and storing data according to all magnifications, and accordingly, there is a problem that data accuracy is deteriorated.

In addition, the actuator for moving the zoom lens and the focus lens includes a spring or a ball. In addition, the spring-based or ball-based actuator has a characteristic such as force (or elasticity) that varies depending on the number of uses, and thus, there is a problem in that lens movement accuracy is deteriorated.

DISCLOSURE

Technical Problem

In the present embodiment, in a camera module including a plurality of cameras, a camera module capable of sharing focal position information of each of the plurality of cameras and an operation method thereof is provided.

In addition, according to the present embodiment, a camera module capable of finding an accurate focal position of a first camera using focal position information of a second camera having high focus accuracy reliability and an operation method thereof is provided.

The technical problems to be achieved in the proposed embodiment are not limited to the technical problems mentioned above, and other technical problems not mentioned may be clearly understood by those of ordinary skill in the art to which the proposed embodiment belongs from the following description.

Technical Solution

According to an embodiment, a method of operating a camera device may include detecting a first phase difference by comparing a reference image and a first image acquired by a first camera; detecting a second phase difference by comparing the reference image and a second image acquired by a second camera; and determining a focal movement position of a second focus lens of the second camera by using the second phase difference, and when the first phase difference is greater than or equal to a preset threshold, determining a focal movement position of a first focus lens of the first camera by using the focal movement position of the second focus lens of the second camera.

In addition, the focal movement positions of the first and second focus lenses are movement distances of the first and second focus lenses or a change in curvature of the first and second focus lenses.

In addition, at least one of the first and second focus lenses includes a liquid lens.

Further, the focal movement position of the first focus lens is determined based on a relationship between the focal movement position of the second focus lens and the focal movement position of the first focus lens.

In addition, the determining of the focal movement position of the first focus lens may include acquiring a focal movement position of the first focus lens corresponding to the focal movement position of the second focus lens from a pre-stored compensation table; and determining the acquired focal movement position as the focal movement position of the first focus lens, and the compensation table includes: a focal movement position of the second focus lens to be applied for each phase difference of the second image, and a focal movement position of the first focus lens corresponding to a focal movement position of the second focus lens determined based on the relationship.

In addition, the reference image is an image having a phase difference of 0 acquired at the best focal position of the first or second focus lens.

In addition, before the first image is acquired, further comprising determining a zoom position of a zoom lens of the first camera and a focal position of the first focus lens, wherein the zoom position of the zoom lens and the focal position of the first focus lens are determined based on the zoom position of the zoom lens divided according to a distance to a subject and first focal position information of the first focus lens corresponding to the zoom position.

In addition, if the first phase difference is less than the threshold value, maintaining the focal position of the first focus lens determined based on the first focal position information.

In addition, at least one of the first and second images is a moving picture including a plurality of frames.

In addition, the camera device includes a first camera including a first focus lens and configured to acquire a first image; a second camera including a second focus lens and configured to acquire a second image; and a controller configured to detect a first phase difference between a reference image and the first image and a second phase difference between the reference image and the second image, wherein the controller is configured to determine a focal movement position of the second focus lens of the second camera by using the second phase difference, and when the first phase difference is greater than or equal to a preset threshold, to determine a focal movement position of the first focus lens of the first camera using the focal movement position of the second focus lens of the second camera.

In addition, the camera device includes: a first camera including a zoom lens and a first focus lens; a second camera including a second focus lens; and a controller configured to determine a focal movement position of the second focus lens, wherein the first camera is configured to acquire a first image having a first phase difference different from a reference image through the first focus lens, and the second camera is configured to acquire a second image having a second phase difference different from the reference image through the second focus lens, and the controller is configured to calculate the first phase difference and the second phase difference, compare the first phase difference and a preset threshold, and determine the focal movement position of the second focus lens by using the second phase difference.

In addition, the focal movement position of the second focus lens is a movement distance of the second lens or a change in curvature of the second focus lens.

In addition, at least one of the first and second focus lenses includes a liquid lens.

Further, the focal movement position of the first focus lens is determined based on a relationship between the focal movement position of the second focus lens and the focal movement position of the first focus lens.

In addition, a storage configured to store a compensation table for a focal movement position of the first focus lens corresponding to a focal movement position of the second focus lens, wherein the compensation table includes: a focal movement position of the second focus lens to be applied for each phase difference of the second image, and a focal movement position of the first focus lens corresponding to a focal movement position of the second focus lens determined based on the relationship, wherein the controller is configured to acquire the focal movement position of the first focus lens corresponding to the focal movement position of the second focus lens from the stored compensation table; and determine the acquired focal movement position as the focal movement position of the first focus lens.

In addition, the reference image is an image having a phase difference of 0 acquired at a best focal position of the first or second focus lens.

In addition, the controller is configured to determine a zoom position of the zoom lens of the first camera and a focal position of the first focus lens before the first image is acquired, and wherein the zoom position of the zoom lens and the focal position of the first focus lens are determined based on the zoom position of the zoom lens divided according to a distance to a subject and first focal position information of the first focus lens corresponding to the zoom position.

In addition, when the first phase difference is less than the threshold value, the controller is configured to maintain the focal position of the first focus lens determined based on the first focal position information.

In addition, at least one of the first and second images is a moving picture including a plurality of frames.

In addition, the controller is configured to receive from a set, a focal movement position of the first focus lens determined based on the focal movement position of the second focus lens from a set when the first phase difference is greater than or equal to the threshold value and to move the first focus lens to the received focal movement position Advantageous Effects In the present embodiment, in a camera module including the first and second cameras, focal position information of the first camera and focal position information of the second camera are matched with each other. Further, when the first camera is automatically focused, the accuracy of the current focal position of the first camera is determined based on the phase difference of the image acquired through the first camera. Thereafter, when the accuracy of the current focal position of the first camera is low, the correct focal position of the first camera is tracked by using the focal position information of the second camera according to the matching. As described above, in the embodiment according to the present invention, when implementing the auto focus function of the first camera, not only zoom tracking of the first camera but also the focal movement position is tracked using the focal position information of the second camera, and accordingly, accuracy can be improved.

In addition, in the present embodiment, an operation for increasing the focal position accuracy of the first camera is performed by the second camera only when the zoom magnification of the first camera is changed. Accordingly, in an embodiment according to the present invention, it is possible to minimize the amount of power consumed by the operation of the second camera.

In addition, in the present embodiment, when the focal position information of the first camera is incorrect at a specific point, the focal position information of the first camera for the specific point is updated using the focal position information of the second camera. Accordingly, in an embodiment according to the present invention, it is possible to improve the accuracy of the focal position without being affected by a change in characteristics of an actuator that changes according to the number of times or time of use of the camera module.

BEST MODE

Figure 1:
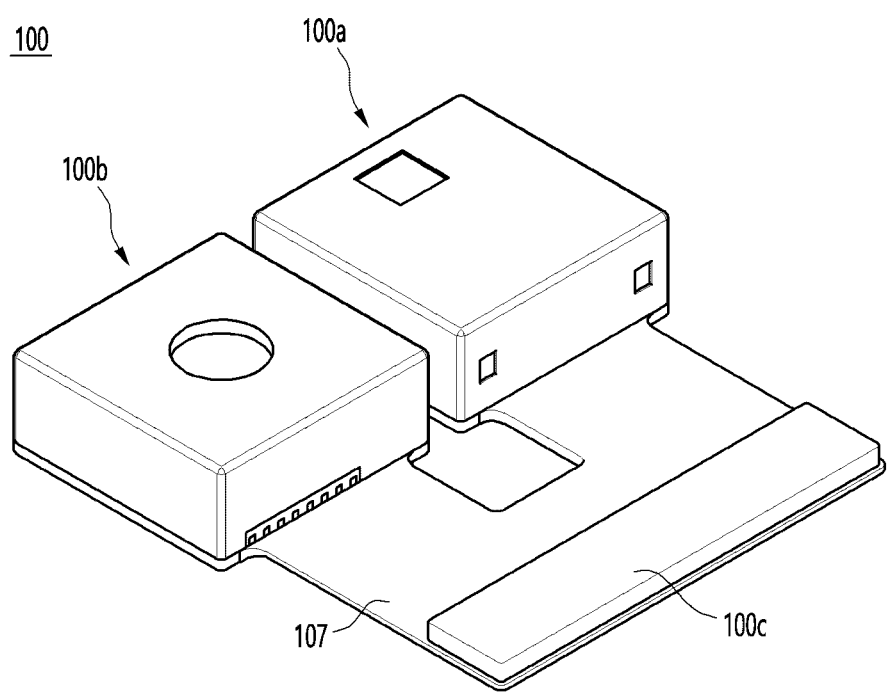
FIG. 1 is a perspective view of a camera module according to the present embodiment.

Hereinafter, preferred embodiments of the present invention will be described in detail with reference to the accompanying drawings.

However, the technical idea of the present invention is not limited to some embodiments to be described, but may be implemented in various different forms, if it is within the scope of the technical idea of the present invention, one or more of the constituent elements may be selectively combined and substituted between embodiments.

In addition, terms (including technical and scientific terms) used in the embodiments of the present invention, unless explicitly defined and described, the present invention can be interpreted as a meaning that can be generally understood by those of ordinary skill in the art, and terms commonly used, such as terms defined in the dictionary, may be interpreted in consideration of the meaning in the context of the related technology.

In addition, terms used in the embodiments of the present invention are for describing the embodiments and are not intended to limit the present invention. In this specification, the singular form may also include the plural form unless specifically stated in the phrase, when described as "at least one (or one or more) of A and (and) B and C", it may include one or more of all combinations that can be combined with A, B, and C. In addition, in describing the constituent elements of an embodiment of the present invention, terms such as first, second, A, B, (a), and (b) may be used. These terms are only for distinguishing the component from other components, and are not limited to the nature, order, or order of the component by the term.

And, if a component is described as being 'connected', 'coupled' or 'connected' to another component, the component is not only directly connected, coupled or connected to the other component, the case of being 'connected', 'coupled' or 'connected' due to another component between the component and the other component may also be included.

In addition, if it is described as being formed or disposed on the "on (upper) or under (lower)" of each component, the on (upper) or under (lower) includes not only the case where the two elements are in direct contact with each other, but also the case where one or more other elements are formed or disposed between the two elements. In addition, when expressed as "on (upper) or under (lower)", the meaning of not only an upward direction but also a downward direction based on one component may be included.

A camera device according to an embodiment of the present invention may be a dual camera module including a plurality of cameras.

The camera device as described above may be installed in an optical device. In this case, the camera device may also be referred to as a camera module, and hereinafter, a camera device and a camera module will be mixed and used.

Here, in the optical device may be any one of a mobile phone, a smart phone, a portable smart device, a digital camera, a laptop computer, a digital broadcasting terminal, personal digital assistants (PDA), portable multimedia player (PMP) and navigation. However, the type of optical device is not limited thereto, and any device for photographing an image or photograph may be referred to as an optical device.

The optical device may include a main body (not shown), a dual camera module, and a display (not shown). However, in the optical device, any one or more of the main body, the dual camera module, and the display may be omitted or changed. The main body can form the appearance of an optical device. As an example, the body may have a rectangular parallelepiped shape. As another example, the body may be formed to be round at least in part. The main body may accommodate a camera module. The display may be disposed on one surface of the main body. For example, the display and the camera module may be disposed on one surface of the main body, and a camera module may be additionally disposed on the other surface of the main body (a surface located opposite to one side).

The camera module may be disposed on the main body of the optical device. The camera module may be disposed on one surface of the main body. At least a part of the camera module may be accommodated in the main body. The camera module may include two cameras. In addition, in the optical device, an additional camera other than the two cameras may be further disposed on one of one surface and the other surface of the main body. The camera module may take an image of a subject.

The display may be disposed on the main body of the optical device. The display may be disposed on one surface of the main body. That is, the display may be disposed on the same surface as the camera module. Alternatively, the display may be disposed on the other surface of the main body. The display may be disposed on a surface of the main body opposite to a surface on which the camera module is disposed. The display may output an image captured by the camera module.

Hereinafter, a configuration of a camera module according to an embodiment of the present invention will be described with reference to the drawings.

FIG. 1 is a perspective view of a camera module according to an embodiment of the present invention.

Referring to FIG. 1, a camera module may be included a circuit board 107, a first camera module 100a disposed on a first area of the circuit board 107, and a second camera module 100b disposed on a second area spaced apart from the first area of the circuit board 107 by a predetermined interval, and a connector 100c connected to a main body of an optical device (not shown).

The circuit board 107 may be divided into a plurality of areas.

Preferably, the circuit board 107 may be divided into a first area in which the first camera module 100a is disposed, a second area in which the second camera module 100b is disposed, and a third area in which the connector 100c is disposed. The circuit board 107 may have rigidity. The circuit board 107 may be a rigid printed circuit board (RPCB). Alternatively, the circuit board 107 may have flexibility. The circuit board 107 may be a flexible printed circuit board (FPCB, Flexible Printed Circuit Board).

In addition, the circuit board 107 may have different characteristics for each region. Preferably, the first and second regions of the circuit board 107 may have rigidity to support the first camera module 100a and the second camera module 100b. In addition, the third region of the circuit board 107 may have flexibility to facilitate connection with the optical device.

The first camera module 100a may be a zoom camera module. The first camera module 100a is equipped with a zoom function, and the first camera module 100a may be a camera module that zoom-up or zoom-out for photographing by increasing or decreasing a magnification of a distant subject according to an input signal input from the outside. To this end, the first camera module 100a may include a zoom lens (described later).

The second camera module 100b may be a general camera that photographs a subject according to a fixed zoom magnification.

That is, in general, only the second camera module 100b may be provided in an optical device, and differently, both the first camera module 100a with the zoom function may be provided together with the second camera module 100b in the optical device. The camera module as described above may be referred to as a dual camera module.

Each of the first camera module 100a and the second camera module 100b may include a lens assembly and a lens barrel receiving the lens assembly.

In this case, the lens assembly provided in the first camera module 100a may include a focus lens for focusing and a zoom lens for a zoom function. In addition, in the lens assembly provided in the second camera module 100b, the zoom lens included in the first camera module 100a may be omitted. Here, one configuration of the first and second camera modules 100a and 100b is not limited to a lens barrel, and any holder structure capable of supporting one or more lenses may be used.

Each of the first camera module 100a and the second camera module 100b may include an image sensor. In this case, the image sensor provided in the first camera module 100a may have the same pixel structure as the image sensor provided in the second camera module 100b. In addition, differently, the image sensor provided in the first camera module 100a may have a different pixel structure from the image sensor provided in the second camera module 100b. Preferably, the reliability of the image sensor provided in the second camera module 100b may be higher than the reliability of the image sensor provided in the first camera module 100a. That is, the image sensor may include a detection sensor. The detection sensor may configure some pixels of the image sensor in order to provide a PDAF (Phase Difference Auto Focusing) function. In addition, the detection sensor may have a difference in reliability according to an arrangement method or arrangement number.

That is, the first camera module 100a includes a zoom lens. In addition, when the zoom function is operated, a search section of the focus lens for autofocus is narrower than the second camera module 100b in the lens barrel. In addition, since the first camera module 100a has a zoom lens movement section within the lens movement section, a movement section of the focus lens is relatively smaller than the second camera module 100b. Accordingly, an image sensor having high reliability may be disposed in the second camera module 100b, and an image sensor having a lower reliability compared to the second camera module 100b may be disposed in the first camera module 100a. Further, in an embodiment according to the present invention, the accuracy of a focal position of the first camera module 100a is improved by using the focal position information of the second camera module 100b on which the image sensor with high reliability is disposed. This will be described in more detail below.

The connector 100c may receive power from the outside to supply driving power to the first camera module 100a and the second camera module 100b, respectively.

In addition, the connector 100c may provide a control signal provided from a main controller (not shown) of the optical device to the first camera module 100a and the second camera module 100b, respectively. In addition, the connector 100c may transmit images acquired by the first camera module 100a and the second camera module 100b to the optical device.

Figure 2:
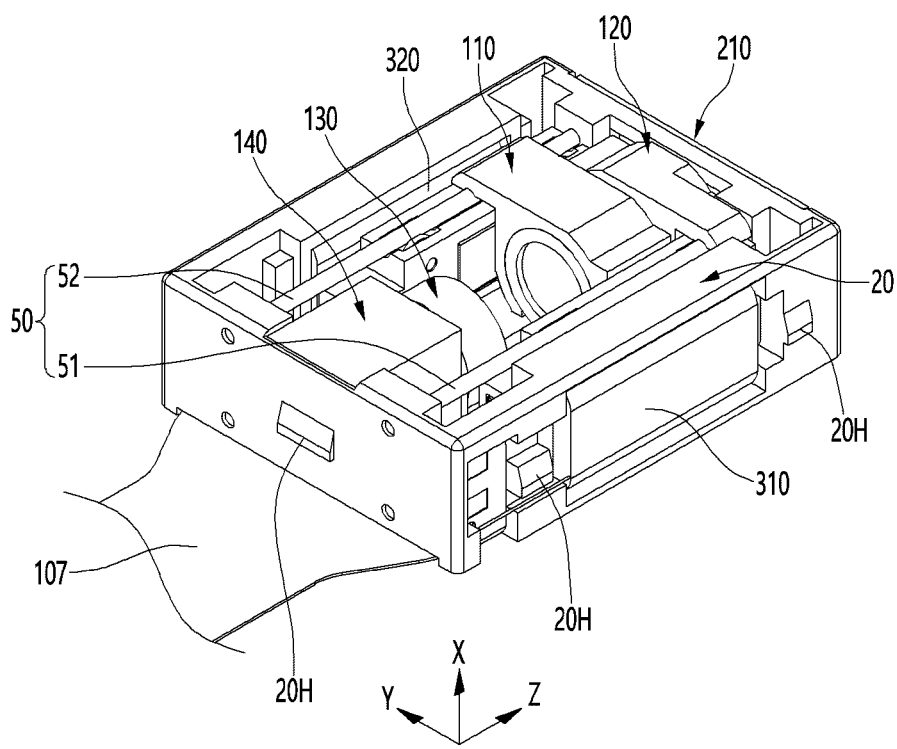
FIG. 2 is a perspective view of a cover removed from the first camera module according to the embodiment illustrated in FIG. 1.

FIG. 2 is a perspective view of a cover removed from the first camera module according to the embodiment illustrated in FIG. 1. Meanwhile, in the embodiment, the first camera module 100a and the second camera module 100b may have substantially the same structure except that some lens assemblies are omitted. Preferably, the first lens assembly 110 corresponding to the zoom lens assembly described below may be provided only in the first camera module 100a, and may be omitted in the second camera module 100b. However, this is only an exemplary embodiment, and the first lens assembly 110 may also be provided in the second camera module 100b, and thus the first and second camera modules may have the same structure.

Hereinafter, only the structure of the first camera module will be described for convenience of description.

Referring to FIG. 2, in the first camera module 100a according to the embodiment, various optical systems may be coupled to a specific mount 20. For example, a prism 140 and a lens group are disposed on the mount 20, and a cover may be coupled through a hook 20H of the mount 20.

The cover may be coupled to the mount 20. The cover may cover a component received in the mount 20, thereby protecting the components of the first camera module. The mount 20 may be referred to as a base. The cover may be coupled to the mount 20 through fitting. In addition, the cover may be coupled to the mount 20 by an adhesive. For example, a hook 20H may protrude from a side surface of the mount 20, the cover has a hole formed at a position corresponding to the hook H, and the hook of the mount 20 is mounted in the hole of the cover so that the cover and the mount 20 may be coupled. In addition, the cover may be stably coupled to the mount 20 using an adhesive.

In addition, a circuit board 107 as described above may be disposed under the mount 20. In addition, the circuit board 107 may be electrically connected to lens drivers disposed inside the mount 20.

In the first camera module 100 according to the embodiment, an optical system and a lens driver may be disposed on the mount 20. For example, the first camera module 100 according to the embodiment may include at least one of a first lens assembly 110, a second lens assembly 120, a third lens group 130, a prism 140, and a first driver 310, a second driver 320, a rod 50, and an image sensor 210.

The first lens assembly 110, the second lens assembly 120, the third lens group 130, the prism 140, the image sensor 210, and the like may be classified as an optical system.

In addition, the first driver 310, the second driver 320, and the rod 50 may be classified as a lens driver, and the first lens assembly 110 and the second lens assembly 120 may also serve as a lens driver. The first driver 310 and the second driver 320 may be a coil driver, but are not limited thereto.

The rod 50 may serve as a guide function of the lens assembly to be moved, and may be provided in singular or plural. For example, the rod 50 may include a first rod 51 and a second rod 52, but is not limited thereto.

In the axial direction shown in FIG. 2, the Z-axis means an optical axis direction or a direction parallel thereto. The Y-axis means a direction perpendicular to the Z-axis on the ground (YZ plane). The X-axis means the direction perpendicular to the ground.

In an embodiment, the prism 140 converts incident light into parallel light. For example, the prism 140 changes the incident light into parallel light by changing the optical path of the incident light to the optical axis Z parallel to the central axis of the lens group. Thereafter, the parallel light passes through the third lens group 130, the first lens assembly 110, and the second lens assembly 120, and enters the image sensor 210 to capture an image.

Hereinafter, in the description of the embodiment, the first camera module 100a is described as having two moving lens groups, but is not limited thereto, and the number of moving lens groups may be three, four, or five or more. In addition, the second camera module 100b may have one moving lens group. In addition, the optical axis direction Z means a direction that is the same as or parallel to the direction in which the lens groups are aligned.

The first camera module 100a according to the embodiment may perform a zooming function. For example, in the embodiment, the first lens assembly 110 and the second lens assembly 120 may be a moving lens that moves through the first driver 310, the second driver 320, and the rod 50. In addition, the third lens group 130 may be a fixed lens.

For example, in an embodiment, the first lens assembly 110 and the second lens assembly 120 may include a moving lens group, and the third lens group 130 may be a fixed lens group.

The third lens group 130 may perform a function of a focator for forming parallel light at a specific position.

In addition, the first lens assembly 110 may perform a variable function (variator) of re-imaging an image formed by the third lens group 130, which is the focator, to another location. On the other hand, in the first lens assembly 110, the magnification change may be large due to the large change in the distance or the image distance to the subject, and the first lens assembly 110 as the variator may play an important role in the change in the focal length or magnification of the optical system.

On the other hand, the image of the image in the first lens assembly 110, which is the variator, may be slightly different depending on the location. Accordingly, the second lens assembly 120 may perform a position compensation function for an image formed by the variable power. For example, the second lens assembly 120 may perform a function of a compensator that performs a role of accurately forming an image of a store imaged in the first lens assembly 110, which is a variable factor, at the position of the actual image sensor 210.

For example, the first lens assembly 110 may be a zoom lens assembly that performs a zooming function, and the second lens assembly 120 may be a focus lens assembly that performs a focus function.

Figure 3A:
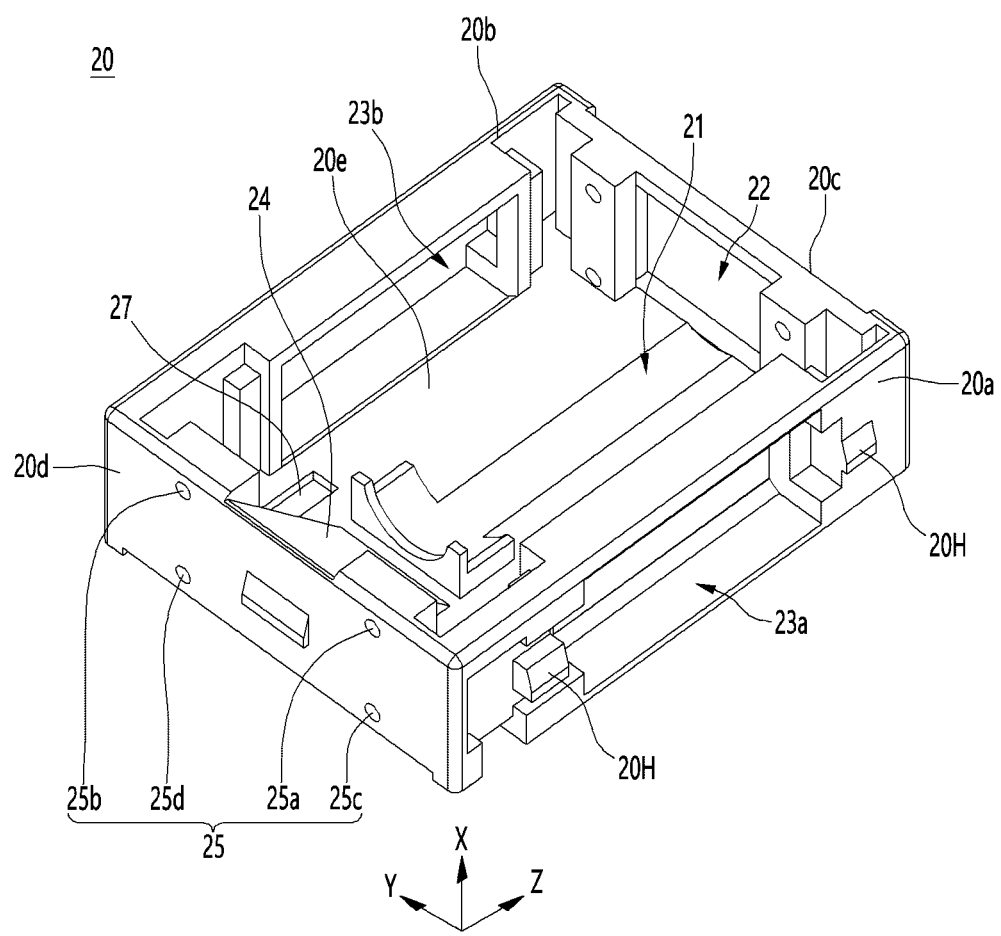
FIG. 3a is a perspective view of the mount 20 in the first camera module according to the embodiment shown in FIG. 2.

First, FIG. 3a is a perspective view of the mount 20 in the first camera module according to the embodiment shown in FIG. 2. The mount 20 may have a rectangular parallelepiped shape, and may include four side surfaces and a bottom surface 20e. For example, the mount 20 may include first to fourth side surfaces 20a, 20b, 20c, and 20d, and a first side surface 20a, a second side surface 20b, and a third side surface 20c and the fourth side surface 20d may each face each other.

A hook 20H is formed on at least one side of the mount 20 to be coupled to a hole of the cover 10.

*In addition, the first guide groove 112G in which the first lens assembly 110, the second lens assembly 120, and the third lens group 130 are located may be formed located on the bottom surface 20e of the mount 20 in the optical axis (Z) direction. The first guide groove 112G may be concave downward according to an outer circumference shape of the lens, but is not limited thereto.

In addition, a first opening 23a and a second opening 23b in which the first driver 310 and the second driver 320 are respectively disposed may be formed on the first side surface 20a and the second side surface 20b of the mount 20. In addition, a third opening 22 in which the image sensor 210 is disposed may be formed on the third side surface 20c of the mount 20.

In addition, a single or a plurality of fourth openings 27 through which the circuit board 107 is exposed may be formed on the bottom surface of the mount 20.

Further, the third side surface 20c of the mount 20 and the fourth side surface 20d facing the third side surface 20d may have a single or a plurality of coupling holes 25 to which the rod 50 is coupled. For example, a first coupling hole 25a, a second coupling hole 25b, a third coupling hole 25c, and a fourth coupling hole 25d may be formed on the third side surface 20c and the fourth side surface 20d of the mount 20, and the first rod 51, the second rod 52, the third rod 53, and the fourth rod 54 may be respectively coupled thereto.

In addition, a prism mounting part 24 for disposing the prism 140 may be formed inside the fourth side surface 20d of the mount 20.

A material of the mount 20 may be formed of at least one of plastic, glass-based epoxy, polycarbonate, metal, or composite material.

Figure 3B:
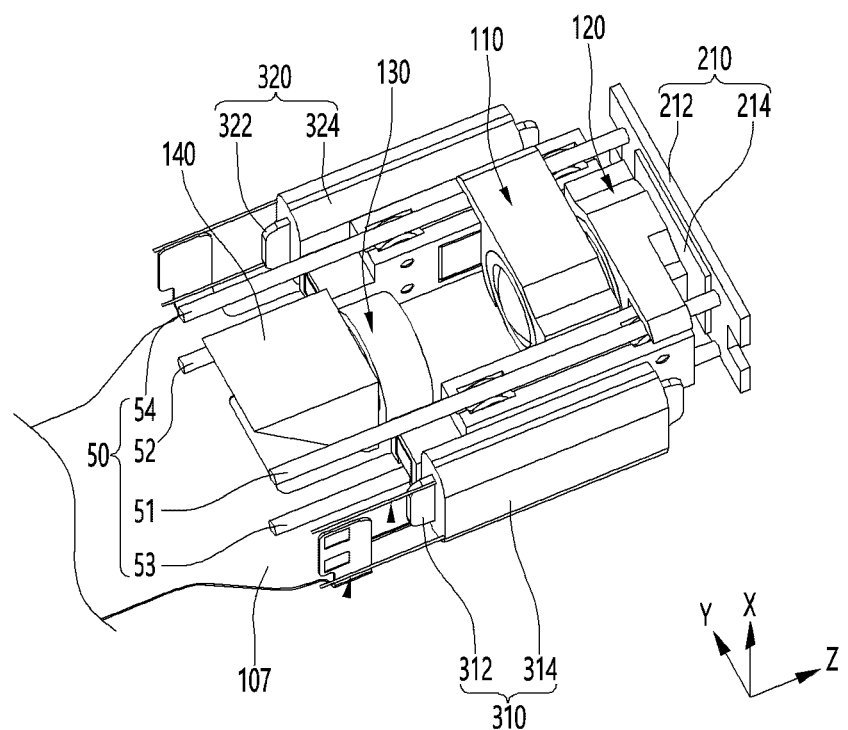
FIG. 3b is a perspective view with the mount 20 removed from the camera module according to the embodiment illustrated in FIG. 2.

Next, FIG. 3b is a perspective view of the camera module according to the embodiment shown in FIG. 2 with the mount 20 removed, showing an optical system and a lens driver.

In an embodiment, the lens driving device may include a mover and a fixed part. The mover is a concept corresponding to a fixed part and may be referred to as a moving part. For example, the mover may mean a lens assembly that is moved by a rolling motion of a wheel. On the other hand, the fixed part may mean a mount, a rod, etc. that are not moved.

The camera module according to the embodiment may include an optical system such as the prism 140, the first lens assembly 110, the second lens assembly 120, the third lens group 130, and the image sensor 210 on the mount 20. In addition, the camera module of the embodiment may include a lens driver such as the first driver 310, the second driver 320, and the rod 50. The first lens assembly 110 and the second lens assembly 120 may also perform a lens driving function.

The rod 50 may include first to fourth rods 51, 52, 53, 54, and the first to fourth rods 51, 52, 53, and 54 are coupled to the first to fourth coupling holes 25a, 25b, 25c, and 25d (refer to FIG. 3a), respectively, so that the first lens assembly 110 and the second lens assembly 120 may function as a movement guide. The rod 50 may be formed of at least one of plastic, glass-based epoxy, polycarbonate, metal, or composite material.

The first driver 310 may be a coil driver, and a first coil 314 may be wound around a first core 312 such as an iron core. In addition, the second driver 320 may also be a coil driver in which a second coil 324 is wound around a second core 322 such as an iron core.

First, the prism 140 changes the optical path of the incident light to an optical axis parallel to the central axis Z of the lens group to change the incident light into parallel light. Thereafter, the parallel light may pass through the third lens group 130, the first lens assembly 110, and the second lens assembly 120 to be captured by the image sensor 210.

The prism 140 may be an optical member having a triangular column shape. In addition, the embodiment may employ a reflective plate or a reflective mirror instead of the prism 140.

In addition, in the embodiment, if the image sensor 210 is not disposed in a direction perpendicular to the optical axis, an additional prism (not shown) may be further provided to allow the light passing through the lens group to be imaged by the image sensor 210.

In an embodiment, the image sensor 210 may be disposed perpendicular to the optical axis direction of the parallel light. The image sensor 210 may include a solid-state imaging device 214 disposed on the second circuit board 212. For example, the image sensor 210 may include a Charge Coupled Device (CCD) image sensor or a Complementary Metal-Oxide-Semiconductor (CMOS) image sensor. Meanwhile, the image sensor 210 may include a detection sensor (described later) for detecting a phase difference image.

Figure 4A:
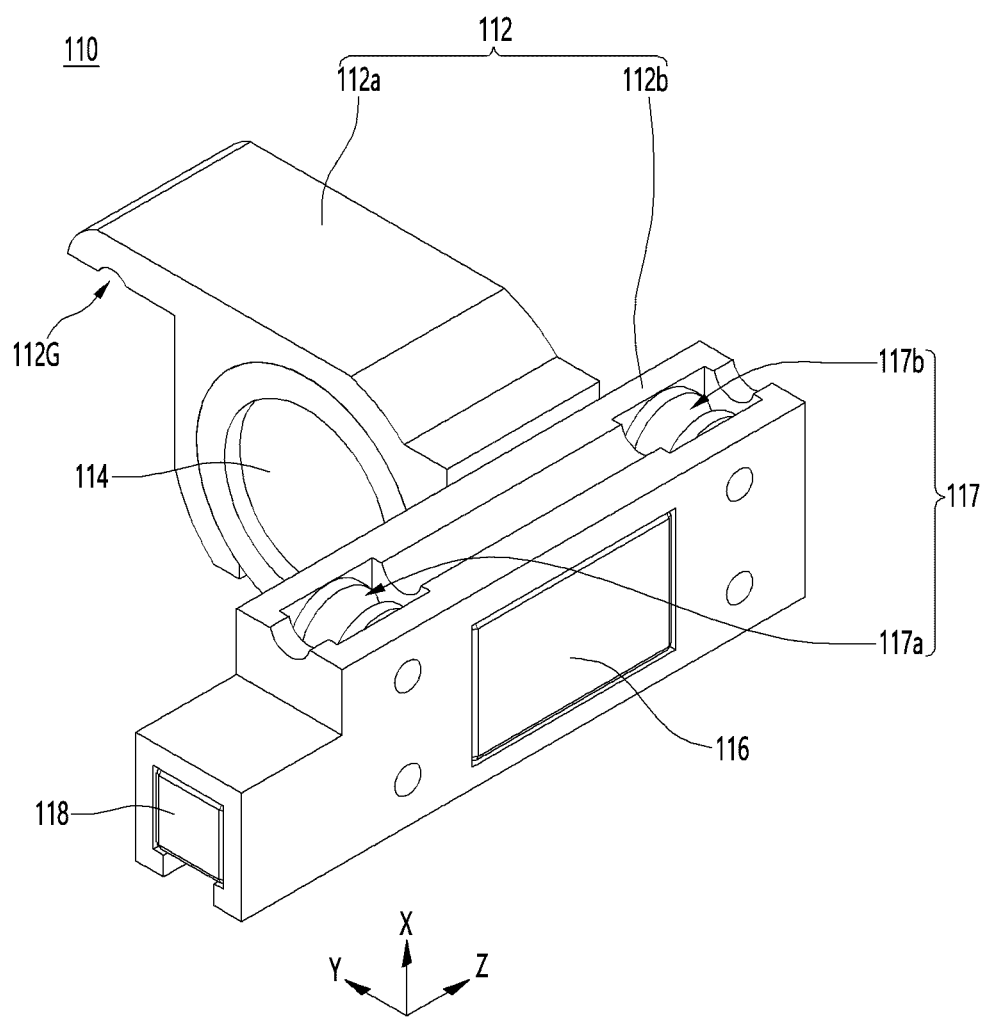
FIG. 4a is a perspective view of a first lens assembly in the camera module according to the embodiment illustrated in FIG. 2.
Figure 4B:
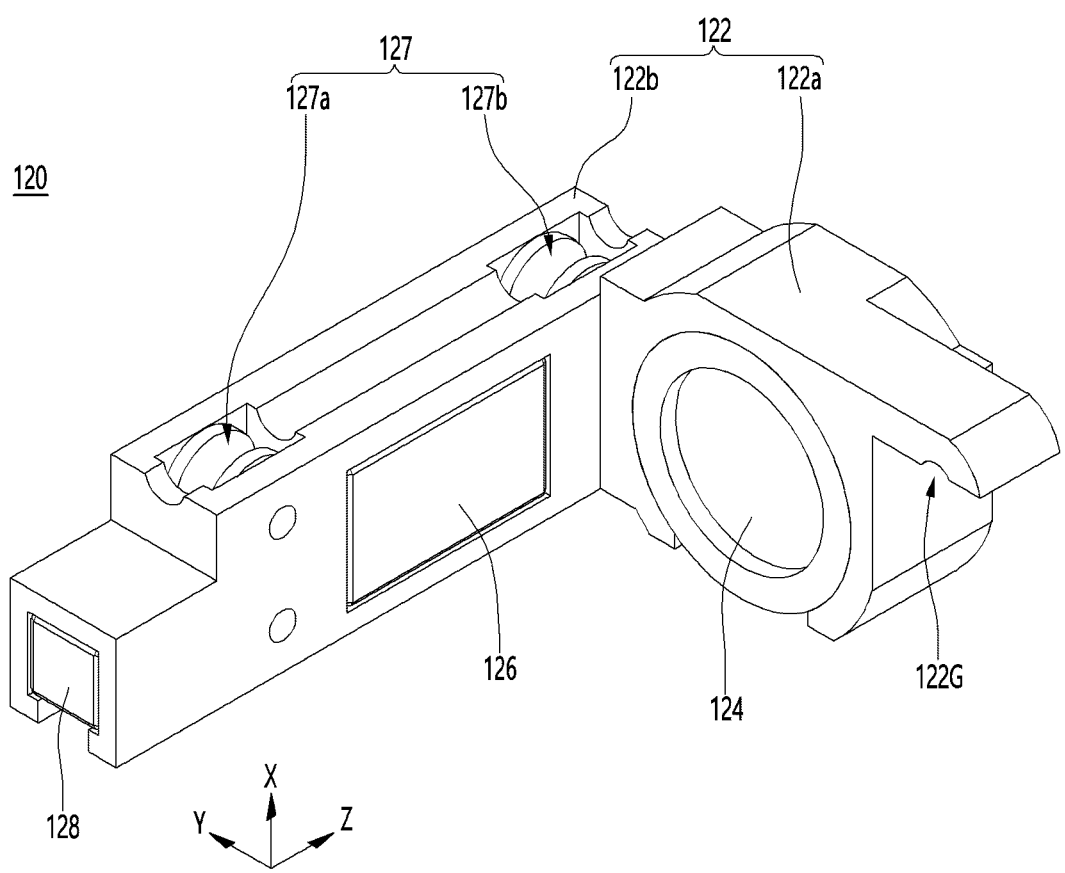
FIG. 4b is a perspective view of a second lens assembly in the camera module according to the embodiment shown in FIG. 2.

Referring to FIGS. 4a and 4b, the first lens assembly 110 and the second lens assembly 120 will be described in more detail in the embodiment.

FIG. 4a is a perspective view of the first lens assembly 110 in the camera module according to the embodiment shown in FIG. 2, and FIG. 4b is a perspective view of the second lens assembly 120 in the camera module according to the embodiment illustrated in FIG. 2.

Referring to FIG. 4a, the first lens assembly 110 according to the embodiment may include any one or more of a first housing 112, a first lens group 114, a first wheel 117, a third driver 116, and a first position sensor 118.

Further, referring to FIG. 4b, the second lens assembly 120 of the embodiment may include any one or more of a second housing 122, a second lens group 124, a second wheel 127, a fourth driver 126, and a second position.

Hereinafter, a description will be given focusing on the first lens assembly 110.

The first housing 112 of the first lens assembly 110 may include a first lens housing 112a and a first driver housing 112b. The first lens housing 112a functions as a barrel, and a first lens group 114 may be mounted. The first lens group 114 may be a moving lens group, and may include a single lens or a plurality of lenses. The second housing 122 of the second lens assembly 120 may also include a second lens housing 122a and a second driver housing 122b.

In this case, a first guide groove 112G may be formed under one end of the first lens housing 112a of the first lens assembly 110. The first lens assembly 110 may be guided by the first guide groove 112G to move in a straight line in the optical axis direction while slidingly contacting the second rod 52. In addition, a second guide groove 122G may also be formed under one end of the second lens housing 122a of the second lens assembly 120.

In the embodiment, since the first housing 112 is provided to move in the optical axis direction by sliding contact between the second rod 52 and the first guide groove 112G, and accordingly, the first camera module that performs an efficient autofocusing and zooming function can be implemented.

In addition, in the embodiment, since the second housing 122 is provided to move in the optical axis direction by sliding contact between the first rod 51 and the second guide groove 122G, and accordingly, the camera module that performs an efficient autofocusing and zooming function can be implemented.

Next, a third driver 116, a first wheel 117, and a first position sensor 118 may be disposed in the first driver housing 112b of the first lens assembly 110. The first wheel 117 may include a plurality of wheels, and may include a first-first wheel 117a and a first-second wheel 117b.

In addition, a fourth driver 126, a second wheel 127, and a second position sensor 128 may be disposed on the second driver housing 122b of the second lens assembly 120. The second wheel 127 may include a plurality of wheels, and may include a second-first wheel 127a and a second-second wheel 127b.

The third driver 116 of the first lens assembly 110 may be a magnet driver, but is not limited thereto. For example, the third driver 116 may include a first magnet that is a permanent magnet. Also, the fourth driver 126 of the second lens assembly 120 may be a magnet driver, but is not limited thereto.

Meanwhile, the second lens assembly 120 may be a liquid lens. Accordingly, the driver for moving the second lens assembly 120 may be a driving voltage driver (not shown) that supplies a driving voltage to the liquid lens to adjust the curvature of an interface of the liquid lens. In the liquid lens, the interface between a conductive liquid and a non-conductive liquid is deformed according to the driving voltage supplied from the driving voltage driver, thereby implementing an auto focus function.

Figure 5:
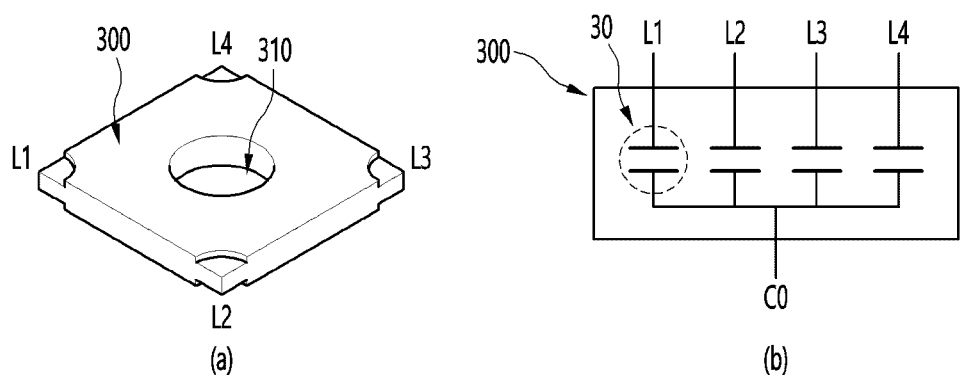
FIG. 5 is a view showing a liquid lens according to the present embodiment.

FIG. 5 is a view showing a liquid lens according to an embodiment of the present invention.

Referring to FIG. 5, the liquid lens 300 may include a cavity 310. The cavity 310 is a portion through which light incident from the outside passes, and at least a portion of the cavity 310 may contain a liquid. For example, the cavity 310 may contain two types, that is, a conductive liquid and a non-conductive liquid (or insulating liquid), and the conductive liquid and the non-conductive liquid may form an interface without being mixed with each other. In addition, the interface between the conductive liquid and the non-conductive liquid is deformed by the driving voltage applied through the driving voltage driver, so that the curvature and/or focal length of the liquid lens 300 may be changed. When such interface deformation and curvature change are controlled, the liquid lens 300 and the first camera module 100*a* including the same may implement an auto focus function.

Specifically, (a) of FIG. 5 shows a liquid lens constituting the second lens assembly 120, and (b) of FIG. 5 is a diagram showing an equivalent circuit diagram of the liquid lens.

First, referring to (a) of FIG. 5, the liquid lens 300 whose interface is adjusted in response to the driving voltage includes a plurality of electrode sectors L1, L2, L3, and L4 that are disposed in four different directions with the same angular distance to constitute a first electrode, and an electrode sector constituting a second electrode. And, the liquid lens 300 may be receive the driving voltage through the electrode sectors. When a driving voltage is applied through a plurality of electrode sectors (L1, L2, L3, L4) constituting the first electrode and the electrode sector constituting the second electrode, the interface between the conductive liquid and the non-conductive liquid disposed in the cavity 310 may be deformed. The degree and shape of the deformation of the interface between the conductive liquid and the non-conductive liquid may be controlled by a separate controller (described later) in order to implement the autofocus function.

Further, referring to (b) of FIG. 5, Further, referring to FIG. 5B, one side of the liquid lens 300 receives voltages from different electrode sectors L1, L2, L3, and L4, and the other side may be described as a plurality of capacitors 30 connected to the electrode sector C0 of the second electrode to receive a voltage.

Hereinafter, the configuration and operation of the camera module 100 configured as described above will be described in detail. As described above, the camera module 100 includes a first camera module 100*a* and a second camera module 100*b*. Further, in the first camera module 100*a* and the second camera module 100*b*, a lens assembly having a focus function corresponding to the second lens assembly 120 may be included. Hereinafter, a lens assembly having a focus function provided in the first camera module 100*a* is referred to as a 'first focus lens', and a lens assembly having a focus function provided in the second camera module 100*b* is referred to as a 'second focus lens'. In addition, the first camera module 100*a* further includes a lens assembly that performs a zoom function corresponding to the first lens assembly 110. Accordingly, hereinafter, a lens assembly having a zoom function provided in the first camera module 100*a* is referred to as a 'zoom lens'. In addition, an image sensor 210 is included in the first camera module 100*a* and the second camera module 100*b*, respectively. Hereinafter, the image sensor provided in the first camera module 100*a* is referred to as a "first image sensor", and the image sensor provided in the second camera module 100*b* is referred to as a "second image sensor".

Figure 6:
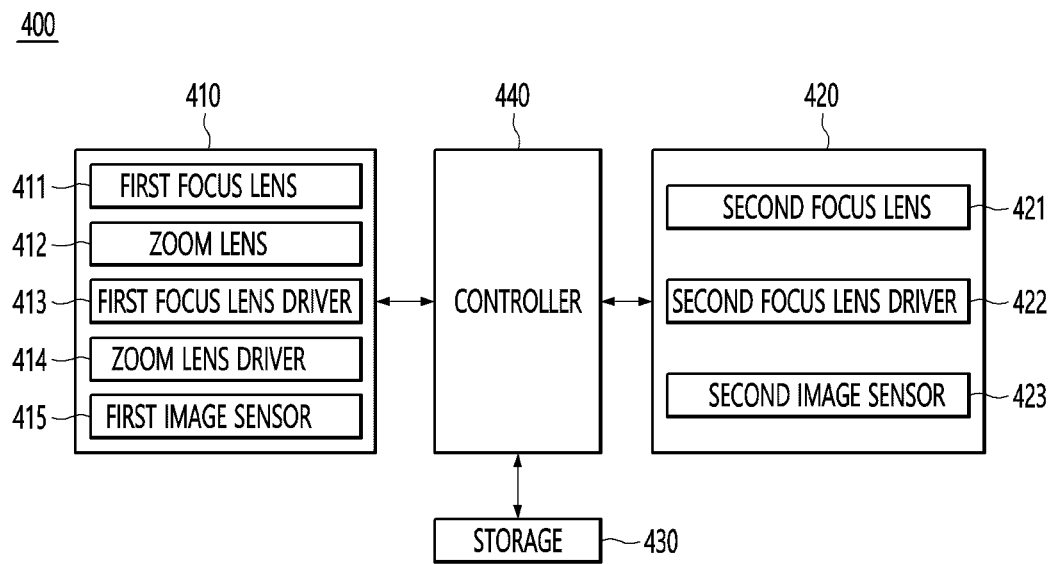
FIG. 6 is a block diagram showing the configuration of a camera module according to the present embodiment.

FIG. 6 is a block diagram showing the configuration of a camera module according to an embodiment of the present invention.

Referring to FIG. 6, the camera module 400 includes a first camera 410, a second camera 420, a storage 430, and a controller 440. The controller 440 may be a camera module controller provided in the camera module 400 separately from a main controller (not shown) disposed in an optical device in which the camera module 400 is mounted.

The first camera 410 acquires a first image. Preferably, the first camera 410 acquires a first image to be imaged according to positions of the first focus lens 411 and the zoom lens 412. In this case, the first image has a zoom magnification determined according to the position of the zoom lens 412. In addition, the first image may be an image that is in focus according to the position of the first focus lens 411, or may be an image that is not in focus.

To this end, the first camera 410 includes a first focus lens 411, a zoom lens 412, a first focus lens driver 413, a zoom lens driver 414, and a first image sensor 415.

The first focus lens driver 413 controls a focal movement position of the first focus lens 411 according to a first control signal provided from the controller 440. In this case, when the first focus lens 411 has the structure shown in FIG. 2, the first control signal may be a position control signal for moving the first focus lens 411 to a specific position. In addition, differently, when the first focus lens 411 has the liquid lens structure shown in FIG. 5, the first control signal may be a driving voltage control signal for changing a curvature of an interface of the first focus lens 411. Here, the focal movement position may be a movement amount or a movement distance of the first focus lens 411. Also, the focal movement position may be a change in curvature of the first focus lens 411.

The first focus lens 411 moves a focal position according to the control of the first focus lens driver 413 so that the subject included in the first image is in focus.

In addition, the zoom lens 412 is driven by the control of the zoom lens driver 414. The zoom lens driver 414 controls a zoom position of the zoom lens 412 according to a second control signal provided from the controller 440. Preferably, the second control signal may be a zoom position control signal according to a zoom magnification input from the outside. In addition, the zoom lens driver 414 moves the zoom lens 412 to a zoom position corresponding to the input zoom magnification according to the zoom position control signal.

In this case, the first and second control signals may be current signals for changing a focal position or a zoom position of the first focus lens 411 or the zoom lens 412. Preferably, the current signal may be a signal for the direction of the current, the intensity of the current, and the amplitude of the current. Also, differently, the first and second control signals may be code signals respectively matched to correspond to the direction of the current, the strength of the current, and the amplitude of the current.

The second camera 420 acquires a second image. Preferably, the second camera 420 acquires a second image to be imaged through the second image sensor 423 according to the position of the second focus lens 421. In this case, the second image may have a fixed zoom magnification. In addition, the second image may be an image that is in focus according to the position of the second focus lens 421, or otherwise, may be an image that is not in focus.

To this end, the second camera 420 includes a second focus lens 421, a second focus lens driver 422, and a second image sensor 423.

The second focus lens driver 422 controls a focal movement position of the second focus lens 421 according to a third control signal provided from the controller 440. In this case, when the second focus lens 421 has the structure shown in FIG. 2, the third control signal may be a position control signal for moving the second focus lens 421 to a specific position. In addition, differently, when the second focus lens 421 has the liquid lens structure shown in FIG. 5, the third control signal may be a driving voltage control signal for changing a curvature of an interface of the second focus lens 421. In this case, the focal movement position of the second focus lens 421 may be a movement distance or movement amount of the second focus lens 421. In addition, the focal movement position of the second focus lens 421 may be a change in curvature of the second focus lens 421.

The second focus lens 421 moves the focal position according to the control of the second focus lens driver 422 so that the subject included in the second image is in focus.

In addition, the third control signal may be a current signal for changing the focal position of the second focus lens 421. Preferably, the current signal may be a signal for the direction of the current, the intensity of the current, and the amplitude of the current. Also, differently, the third control signal may be a code signal each matched to correspond to the direction of the current, the intensity of the current, and the amplitude of the current.

Meanwhile, in each of the first image sensor 415 and the second image sensor 423, a plurality of photo detectors are integrated as respective pixels, the image information of the subject is converted and outputted into electrical data. The first and second image sensors 415 and 423 accumulate an input amount of light, and output an image photographed by the lens according to the accumulated amount of light according to a vertical synchronization signal. In this case, image acquisition is performed by the first and second image sensors 415 and 423 that convert light reflected from the subject into electrical signals. Meanwhile, in order to acquire a color image using the first and second image sensors 415 and 423, a color filter is required, for example, a color filter array (CFA) filter may be employed. The CFA passes only light representing one color per pixel, has a structure that is regularly arranged, and has various shapes depending on the arrangement structure.

The storage 430 stores information necessary for the operation of the camera module or information generated during the operation of the camera module.

The storage 430 may include a storage medium of at least one type of flash memory type, hard disk type, SSD type (Solid State Disk type), SDD type (Silicon Disk Drive type), multimedia card micro type, card type memory (eg, SD or XD memory, etc.), random access memory (RAM), static random access memory (SRAM), read-only memory (ROM), electrically erasable programmable read-only memory (EEPROM), programmable read-only memory (PROM), magnetic memory, magnetic disk, and optical disk based on hardware.

The storage 430 may store first focal position information for moving the zoom lens 412 and the first focus lens 411.

The first focal position information may be information on a focal movement position for moving the focal position of the first focus lens 411 based on the distance from the first camera 410 to the subject to be photographed and the zoom magnification according to the position of the zoom lens 412.

In addition, the storage 430 may store second focal position information for moving the second focus lens 421.

The second focal position information may be information on a focal movement position for moving the focal position of the second focus lens 421 based on the phase difference acquired from a phase difference image of the second camera.

That is, the auto focus function may be implemented by contrast auto focus, phase difference auto focus, and hybrid auto focus method.

In contrast AF (CDAF), while moving the position of the focus lens, a contrast evaluation value indicating the contrast of a captured image is acquired at each focus lens position. Here, the movement of the focus lens position is performed so that the contrast evaluation value increases. And, because the contrast evaluation value is maximum at the best focal position, in contrast AF, the focus lens position is moved to be close to the best focal position, and accordingly, the position at which the contrast evaluation value is maximum is determined as the final focal position.

In phase difference AF (PDAF), if the phase difference is 0 when the focus lens position is at the best focal position, the position of the focus lens is moved so that the phase difference becomes 0.

In addition, in the hybrid AF, the focus lens position is moved to the vicinity of the best focal position by phase difference AF, and then the focus lens position can be precisely moved to the best focal position by contrast AF.

Accordingly, the second camera 420 determines a focal movement position of the second focus lens 421 through the phase difference AF method. To this end, the storage 430 stores the second focal position information for determining the focal movement position of the second focus lens 421.

In addition, the storage 430 may further store third focal position information for determining a focal movement position of the first focus lens 411 by using the second focal position information. The third focal position information matches focal position characteristics of the first focus lens 411 and the second focus lens 421, and this refers to information on the focal position of the first focus lens 411 corresponding to the focal position of the second focus lens 421 acquired based on the matched focal position characteristic. The third focal position information will be described in more detail below.

The controller 440 controls the first camera 410 and the second camera 420, respectively. Preferably, when the first camera 410 operates, the controller 440 determines a focal position of the first focus lens 411 according to a distance to a subject to be photographed and a set zoom magnification. That is, the controller 440 extracts the focal position information of the first focus lens 411 corresponding to the distance to the subject and the zoom magnification based on the first focal position information stored in the storage 430. In addition, the controller 440 outputs the first control signal to the first focus lens driver 413 to move the first focus lens 411 to a focal position corresponding to the acquired focal position information of the first focus lens 411.

In this case, the first focal position information may include focal position information of the first focus lens 411 corresponding to all magnifications and all subject distances. Also, differently, the first focal position information may include focal position information of the first focus lens 411 corresponding to a magnification for a specific point or a subject distance to a specific point. At this time, when the first focal position information includes the distance to the subject to be photographed and the focal position of the first focus lens 411 corresponding to the currently set zoom magnification, the controller 440 may extract this and control the focal position of the first focus lens 411. In addition, when the focal position of the first focus lens 411 corresponding to the distance to the subject to be photographed and the currently set zoom magnification is not included in the first focal position information, the controller 440 may calculate a focal position of the first focus lens 411 to be applied to a current shooting condition based on the first focal position information.

That is, the first focal position information may be information on a zoom position and a focal position acquired for a specific sampling point, and the controller 440 may calculates the focal position of points other than the sampling point by applying an interpolation method. At this time, the controller 440 may calculate the focal position of the first focus lens 411 by applying at least one of a linear interpolation method, a polynomial interpolation method, a spline interpolation method, an exponential interpolation method, a log linear interpolation method, a Lagrange interpolation method, Newton interpolation, and bilinear interpolation.

In addition, the controller 440 determines the accuracy of the focal position of the first focus lens 411 applied based on the first focal position information. To this end, the controller 440 allows a first phase difference image to be acquired through the first image sensor 415. Further, when the first phase difference image is acquired, the controller 440 calculates a first phase difference corresponding to the current position of the first focus lens 411 based on the first phase difference image. In this case, when the current position of the first focus lens 411 is the best focal position, the first phase difference will have a value close to 0, when the current position of the first focus lens is out of focus, the first phase difference may have a value greater than or less than 0.

Further, when an absolute value of the first phase difference is greater than a preset threshold value, the controller 440 re-determines the focal position of the first focus lens 411 using the third focal position information. That is, when the absolute value of the first phase difference is greater than the threshold value, it means that the first focal position information is incorrect, and accordingly, the controller 440 re-moves the focal position of the first focus lens 411 to the best position using the third focal position information. Here, the threshold value may be determined according to the characteristics of the first focus lens 411. In other words, the threshold value may be determined according to a Modulation Transfer Function (MTF) of the first focus lens 411.

The MTF may be expressed as a curve, which is one of the criteria for evaluating lens performance, and indicates how faithfully the contrast of the subject can be reproduced on the image surface (a screen in which light is illuminated) as a spatial frequency characteristic. In the MTF curve, the horizontal axis represents the lens field (the distance from the center of the screen to the edge), and the vertical axis represents the contrast value (the maximum value is 1). In addition, if the slope of the MTF curve is large, even when the focal position is slightly shifted from the best position, the captured image may not be in focus. In addition, if the slope of the MTF curve is small, the captured image may be in focus even when the focal position is slightly shifted within a predetermined range based on the best position. Accordingly, the threshold value may be set with an MTF curve indicating the performance of the first focus lens 411. That is, when the slope of the MTF curve is large due to poor performance of the first focus lens 411, the threshold value may be set to a first value close to zero. In addition, when the slope of the MTF curve is small as the performance of the first focus lens 411 is good, the threshold value may be set to a second value greater than the first value.

Meanwhile, when the first phase difference is greater than the threshold value, it means that the accuracy of the first focal position information is low. This may occur as the first camera 410 does not immediately respond to changes in various photographing conditions (change of subject position, change of subject distance, change of zoom magnification, etc.). In addition, this is because the characteristics of the first focus lens driver 413 driving the first focus lens 411 are changed (for example, the force or elastic force according to the number of use is changed), resulting in a decrease in focus accuracy.

Meanwhile, the controller 440 allows a second phase difference image to be acquired through the second image sensor 423. In addition, when the second phase difference image is acquired, the controller 440 calculates a second phase difference corresponding to the current position of the second focus lens 421 based on the second phase difference image. In this case, when the current position of the second focus lens 421 is the best focal position, the second phase difference will have a value close to zero, and when the position is out of focus, the second phase difference may have a value greater than or less than zero.

In this case, the second phase difference image may be acquired through a phase detection sensor disposed at a specific pixel among pixels constituting the second image sensor 423.

In addition, when the second phase difference is detected, the controller 440 determines a focal movement position of the second focus lens 421 corresponding to the second phase difference based on the second focal position information stored in the storage 430, and causes the second focus lens 421 to move to the determined focal movement position.

At this time, as described above, the first and second image sensors 415 and 423 respectively acquire the first and second phase difference images. In this case, a method of acquiring the first and second phase difference images will be described first.

Figure 7:
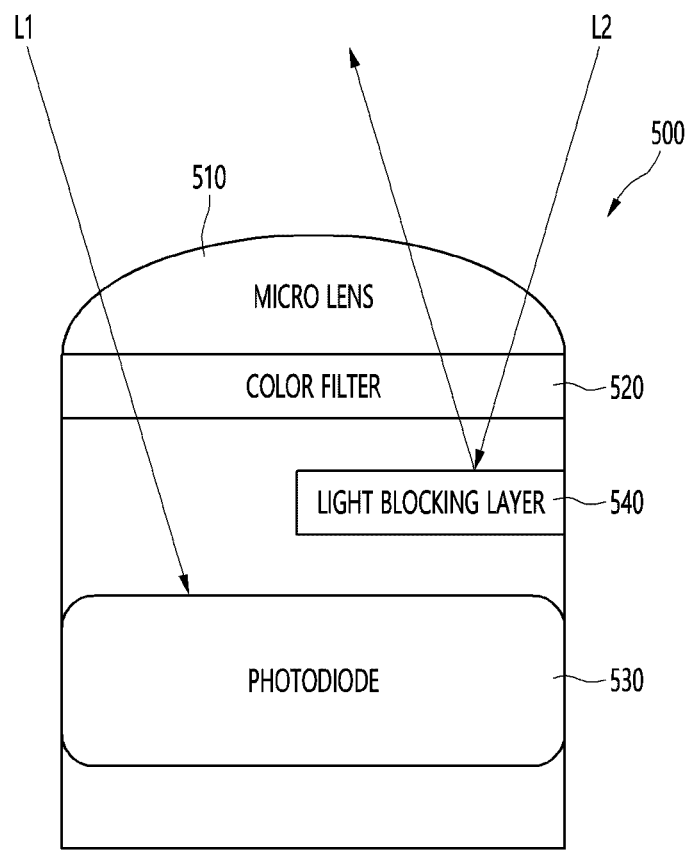
FIG. 7 is a schematic diagram illustrating a phase difference detection pixel of an image sensor constituting a phase detection sensor according to an exemplary embodiment.
Figure 8:
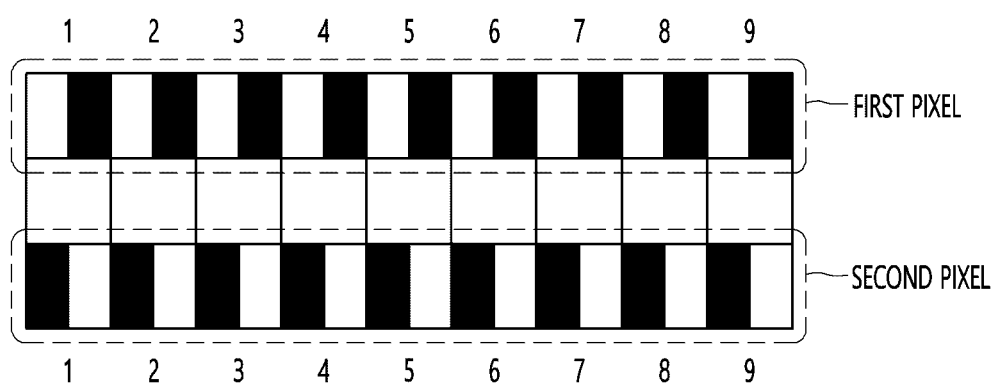
FIG. 8 is a diagram illustrating an embodiment in which the phase difference detection pixels of FIG. 7 are arranged.
Figure 9:
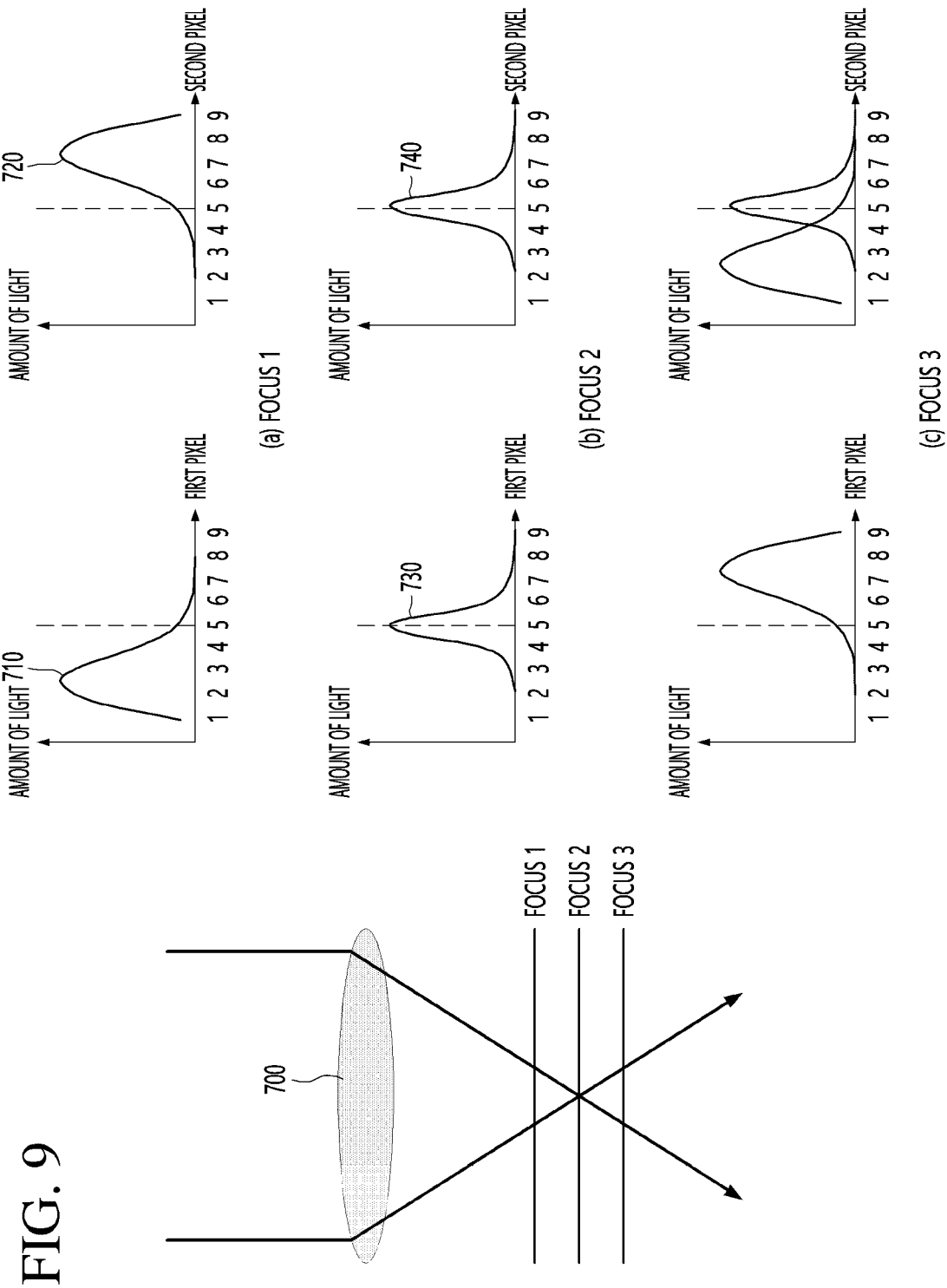
FIG. 9 is a diagram for describing an operation of generating the third control signal based on a first light amount distribution and a second light amount distribution of the phase difference detection pixel of FIG. 8.

FIG. 7 is a diagram schematically showing a phase difference detection pixel of an image sensor constituting a phase detection sensor according to an embodiment of the present invention, FIG. 8 is a diagram showing an arrangement example of the phase difference detection pixels of FIG. 7, and FIG. 9 is a diagram illustrating an operation of generating the third control signal based on a first light amount distribution and a second light amount distribution of the phase difference detection pixel of FIG. 8.

Referring to FIG. 7 to 9, the phase difference detection pixel 500 provided in the first image sensor 415 or the second image sensor 423 includes at least one of a micro lens 510, a color filter 520, a photodiode 530, and a light blocking layer 540. That is, the first image sensor 415 or the second image sensor 423 includes a phase difference detection pixel 500 for acquiring a phase difference image and a normal pixel (i.e., pixels for acquiring a captured image) that are not used for phase difference detection other than the phase difference detection pixel.

The micro lens 510 is disposed on the phase difference detection pixel 500 and can increase light gathering power.

The color filter 530 is disposed under the micro lens 520 and may selectively transmit light of a specific wavelength (e.g., Red, Green, Blue, Magenta, Yellow, Cyan).

The photodiode 530 may accumulate photo charges generated according to the intensity of incident light passing through the micro lens 510. Photo charges accumulated in the photodiode 530 may be converted into electric signals by a driving circuit and a readout circuit and transmitted to the controller 440 as a pixel signal of the phase difference detection pixel 500.

The light blocking layer 540 may block light incident on at least a portion of a light receiving area corresponding to the micro lens 510. For example, the light blocking layer 540 may block light incident on an area corresponding to half of the light receiving area.

As shown in FIG. 7, the light blocking layer 540 is disposed on the right side of the phase difference detection pixel 500, so that the light L1 incident on the left side of the light-receiving area can pass and the light L2 incident on the right side of the light-receiving area can be blocked.

Referring to FIG. 8, a part of the pixel array is shown, the pixel in which the light blocking layer 540 is disposed on the right side of the light-receiving area is defined as a first pixel, and the pixel in which the light blocking layer 540 is disposed on the left side of the light-receiving area is defined as a second pixel. The first pixel and the second pixel may be arranged in different rows of the pixel array. As shown in FIG. 8, one row may be disposed between the first pixel and the second pixel, but the scope of the present invention is not limited thereto, and the first pixel and the second pixel are consecutively disposed, or a plurality of rows may be disposed between the first pixel and the second pixel.

The first pixel may include pixels 1 to 9 arranged in the same row, and the second pixel may include pixels 1 to 9 arranged in the same row.

A k-th pixel of the first pixel (k is an integer of 1 or more and 9 or less) may be disposed in the same column as the k-th pixel of the second pixel. Pixels 1 to 9 of the first pixel and pixels 1 to 9 of the second pixel may be continuously arranged. According to other embodiments, they may be arranged at regular or non-uniform intervals. In this case, the first pixel and the second pixel may be disposed between pixels for generating image data.

In conclusion, the phase difference autofocus is performed based on the act that the position of the light forming image varies according to the focus state of the captured image. That is, when the focus is out of focus, the phase is shifted, and when the focus is achieved, the phase is correct. For example, when the current focal position is in front of the best focal position, the image acquired by the first pixel is shifted to the right of the phase of the reference image in focus (phase is 0), and the image acquired by the second pixel is shifted to the left of the phase of the reference image. Here, it is only an example that each of the first pixel and the second pixel include nine pixels, and it is possible to include less than or more pixels.

Referring to FIG. 9, light passing through the first focus lens 411 or the second focus lens 421 may be focused at an arbitrary position based on a pixel array in which the phase difference detection pixel 500 is disposed. In FIG. 9, a case in which the focus is adjusted to focus 1 to focus 3 is illustrated, and when a pixel array is positioned at focus 2 and the focus is adjusted to focus 2, it is assumed that the focus is a normal focal length.

Focus 1 may refer to a case in which focus is focused in front of the pixel array (ie, a focal length is long), and focus 3 may refer to a case in which a focus is focused at the rear of the pixel array (ie, a focal length is short).

Light passing through the first focus lens 411 or the second focus lens 421 may be incident on the first pixel and the second pixel disposed in the pixel array. Light passing through the left side of the optical axis of the first focus lens 411 or the second focus lens 421 is guided to the first pixel having the light blocking layer 540 on the right side, and the light passing through the right side is guided to the second pixel having the light blocking layer 540 on the left side.

On the right side of FIG. 9, the distribution of the amount of light appearing in the first pixel and the second pixel according to the focus to be focused is shown. The light amount distribution appearing in the first pixel is defined as the first light amount distribution, the light amount distribution appearing in the second pixel will be defined as the second light amount distribution. The first light amount distribution or the second light amount distribution means a set of pixel signals output from the first pixel or the nine pixels included in the second pixel, or continuous data acquired by the controller 440 interpolating the pixel signal.

In addition, the X-axis of the graph including the first light amount distribution and the second light amount distribution indicates the location of the pixel, that is, the number of the pixel, and the Y-axis indicates the magnitude of the amount of light detected by the corresponding pixel.

First, when the focus is focused on focus 2, the first light amount distribution 730 and the second light amount distribution 740 have the same shape, and the center of the shape (for example, the pixel position of the inflection point) may have the same position as the fifth pixel. Here, since the position of the center of the shape determines the phase, when the focus is focused on the focus 2, the first light amount distribution 730 and the second light amount distribution 740 may be in phase with each other. In addition, the same shape may be a concept including not only a shape that is completely physically matched, but also a shape having a similarity of more than a certain range.

When the focus is focused on focus 1, the first light amount distribution 710 and the second light amount distribution 720 have the same shape, but the centers of the shape may have different positions as pixels 3 and 7 respectively. Here, since the position of the center of the shape determines the phase, when the focus 1 is focused, the first light amount distribution 710 and the second light amount distribution 720 are out of phase with each other. In this case, focus 1 means a case where the focal length is longer than the subject, and the phase of the first light amount distribution 710 is shifted to the left based on the center pixel (ie, pixel 5), and the phase of the second light amount distribution 720 is shifted to the right based on the center pixel. In addition, the phase difference (4 pixels), which is the degree to which the centers of the first light amount distribution 710 and the second light amount distribution 720 are shifted from each other, is how much the focal length is shifted from the normal focal length, that is, it can indicate how much the focal length should be adjusted.

When the focus is focused on focus 3, the first light amount distribution 750 and the second light amount distribution 760 have the same shape, but the centers of the shape may have different positions as pixels 7 and 3, respectively.

Here, since the position of the center of the shape determines the phase, when the focus is focused on focus 3, the first light amount distribution 750 and the second light amount distribution 760 are out of phase with each other. At this time, focus 3 means a case where the focal length is shorter than the subject, and the phase of the first light amount distribution 750 is shifted to the right based on the center pixel (ie, pixel 5), and the phase of the second light amount distribution 760 is shifted to the left based on the center pixel. In addition, the phase difference (4 pixels), which is the degree to which the centers of the first light amount distribution 710 and the second light amount distribution 720 are shifted from each other, is how much the focal length is shifted from the normal focal length, that is, it can indicate how much the focal length should be adjusted.

Accordingly, the controller 440 may detect a phase difference between the first light amount distribution and the second light amount distribution based on the first light amount distribution and the second light amount distribution, and generate a control signal for auto focus based on the detected phase difference. That is, the controller 440 may generate a second control signal for moving the focal position of the second focus lens 421 based on the second phase difference.

According to an embodiment, the controller 440 subtracts a pixel number corresponding to the center of the second light quantity distribution from the pixel number corresponding to the center of the first light quantity distribution, and generates the second control signal using the subtraction result. Here, the sign of the subtraction result may determine the direction in which the focal length is varied, and the absolute value of the subtraction result may determine the degree to which the focal length is varied. Here, the result of subtraction of the pixel number may have a phase difference.

For example, when the focus 1 is focused, the subtraction result is −4. In addition, since the sign of the subtraction result is negative, the controller 440 may output a control signal for controlling the focal length to be reduced by 4.

In the present embodiment, in a camera module including the first and second cameras, focal position information of the first camera and focal position information of the second camera are matched with each other. Further, when the first camera is automatically focused, the accuracy of the current focal position of the first camera is determined based on the phase difference of the image acquired through the first camera. Thereafter, when the accuracy of the current focal position of the first camera is low, the correct focal position of the first camera is tracked by using the focal position information of the second camera according to the matching. As described above, in the embodiment according to the present invention, when implementing the auto focus function of the first camera, not only zoom tracking of the first camera but also the focal movement position is tracked using the focal position information of the second camera, and accordingly, accuracy can be improved.

In addition, in the present embodiment, an operation for increasing the focal position accuracy of the first camera is performed by the second camera only when the zoom magnification of the first camera is changed. Accordingly, in an embodiment according to the present invention, it is possible to minimize the amount of power consumed by the operation of the second camera.

In addition, in the present embodiment, when the focal position information of the first camera is incorrect at a specific point, the focal position information of the first camera for the specific point is updated using the focal position information of the second camera. Accordingly, in an embodiment according to the present invention, it is possible to improve the accuracy of the focal position without being affected by a change in characteristics of an actuator that changes according to the number of times or time of use of the camera module.

Hereinafter, an operation of moving the focal position of the first focus lens 411 and the focal position of the second focus lens 421 according to an embodiment of the present invention will be described in detail with reference to the accompanying drawings.

Figure 10:
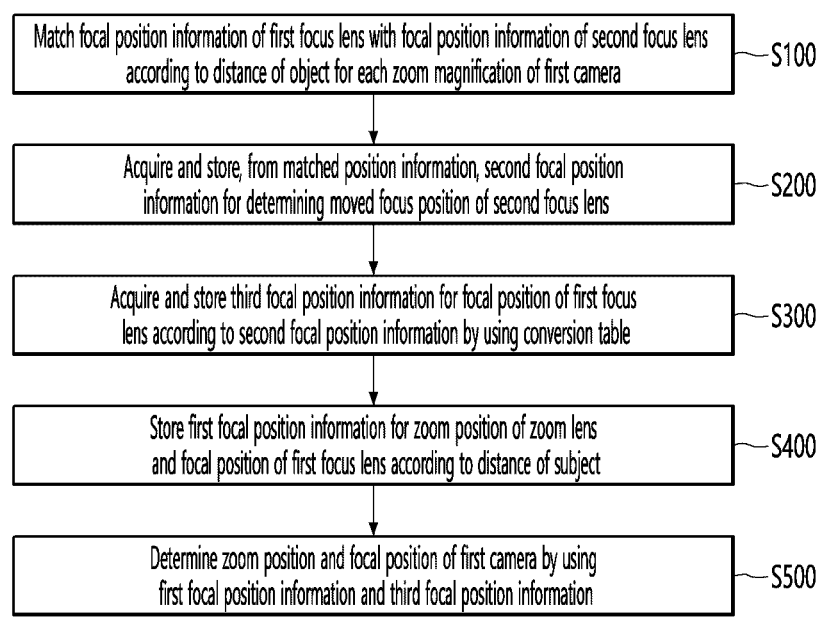
FIG. 10 is a flowchart showing the overall flow of a method of operating a camera module according to the present embodiment.

FIG. 10 is a flowchart showing the overall flow of a method of operating a camera module according to an embodiment of the present invention.

Before describing FIG. 10, in an optical device including a camera module, a dual camera module may be provided to acquire images suitable for various photographing environments. Preferably, the camera module provided in the optical device may include a zoom camera. In this case, a main camera having high resolution and high performance based on a fixed zoom magnification may be additionally mounted in a camera module including a zoom camera. In addition, the main camera may be equipped with an image sensor having high reliability for high resolution and high performance implementation. In addition, the zoom camera does not require high resolution and high performance compared to the main camera, and accordingly, an image sensor having a lower reliability than the image sensor of the main camera may be mounted. Here, the reliability may mean an accuracy of detecting a phase difference of the image sensor. Also, differently, the reliability may mean the accuracy of the auto focus function performed through the image sensor. The reliability may be determined by the arrangement state or number of photodiodes PD included in the image sensor. Meanwhile, in the above, the first camera unit 410 and the second camera unit 420 constituting the camera module have been illustrated as being cameras having different structures, but this is only an example, and the structures of the first and second cameras may be the same.

On the other hand, when the camera module photographs a subject existing in a fixed position, the camera module is in a fixed position, or when the zoom magnification of the camera module is fixed, a problem does not occur at the focal position of the first camera 410.

However, when the distance of the subject continues to change, the zoom magnification continues to change, or the position of the camera module changes (when the user holding the camera module moves), a problem may occur in the focal position of the first camera 410. In other words, in the case of implementing the auto focus function only with the performance of the first camera 410 itself in the above situation, there is a problem that not only the accuracy of the focal position is poor, but it takes a long time to reach the correct focal position. Accordingly, there is a problem in that it is difficult to accurately focus the first image captured through the first camera 410 only by the first camera 410 in a situation where a continuous frame such as a video is captured.

Accordingly, in the present invention, in consideration of the above situation, information on each focal position of the first camera 410 and the second camera 420 is matched and stored in the storage 430, later, the auto focus function of the first camera 410 may be implemented using the stored information.

Meanwhile, the characteristics of the first focus lens 411 of the first camera 410 and the characteristics of the second focus lens 421 of the second camera 420 are different from each other. In addition, the characteristics of the first focus lens driver 413 driving the first focus lens 411 and the second focus lens driver 422 driving the second focus lens 421 are different from each other. That is, even if the first focus lens 411 and the second focus lens 421 are lenses having the same structure, the characteristics may be changed according to an installation location or installation environment, and driving conditions thereof may be different from each other. Here, the characteristic may include a VCM characteristic or a lens movement stroke.

Accordingly, in order to determine the movement position of the first focus lens 411 by using the focal position of the second focus lens 421, mutual matching between the first focus lens 411 and the second focus lens 421 is required.

To this end, the camera module divides the matching condition according to the zoom magnification of the first camera 410, and focal position information of the first focus lens 411 according to a subject distance of the first camera 410 and focal position information of the second focus lens 421 are mutually matched with each other for each of the divided zoom magnifications (step 100).

That is, when the same subject is respectively photographed by the first camera 410 and the second camera 420 at a specific zoom magnification of the first camera unit 410, the focal positions of the first focus lens 411 for photographing the subject and the focal positions of the second focus lens 421 are matched with each other.

In this case, the matching may be performed by being classified by zoom magnification of the first camera 410.

When the focal positions are matched respectively, the camera module acquires and stores second focal potion information for moving the second focus lens 421 to the best focal position based on a phase difference between the second image photographed through the second camera 420 and the reference image at each of the matched focal positions (step 200).

In other words, for the PDAF of the second camera 420, second focal position information indicating the focal position of the second focus lens 421 according to the phase difference of the second image is acquired and stored.

Next, the camera module acquires and stores third focal position information indicating the focal position of the first focus lens 411 corresponding to the focal position of the second focus lens 421 using a conversion table (step 300).

That is, the first focus lens 411 and the second focus lens 421 have different stroke or VCM characteristics, and the focal positions may be different from each other even under the same conditions. Accordingly, the third focal position information acquired by converting the focal position of the second focus lens 421 to the focal position of the first focus lens 411 is acquired and stored based on the second focal position information. To this end, the conversion table including correlation information between the first focus lens 411 and the second focus lens 421 may be acquired in advance.

Next, first focal position information including information on the zoom position of the zoom lens 412 of the first camera 410 and the focal position of the first focus lens 411 according to the distance of the subject is stored (step 400).

The first focal position information is generally referred to as a trace curve, and includes a plurality of curves each divided according to a distance to the subject, and the X axis of the curve represents the position of the first focus lens 411, Y-axis represents the position of the zoom lens 412.

Next, when implementing the auto focus function of the first camera 410, the camera module applies the first focal position information to first move the first focus lens 411. Then, the camera module determines focus accuracy as to whether or not the focus has been accurately achieved at the moved position. And, if the focus accuracy is low, the camera module determines a focal movement position of the first focus lens 411 using the third focal position information, and re-moves the first focus lens 411 to the determined focal movement position (step 500).

Hereinafter, each of the steps (step 100, step 200, step 300, step 400, and step 500) will be described in more detail.

Figure 11:
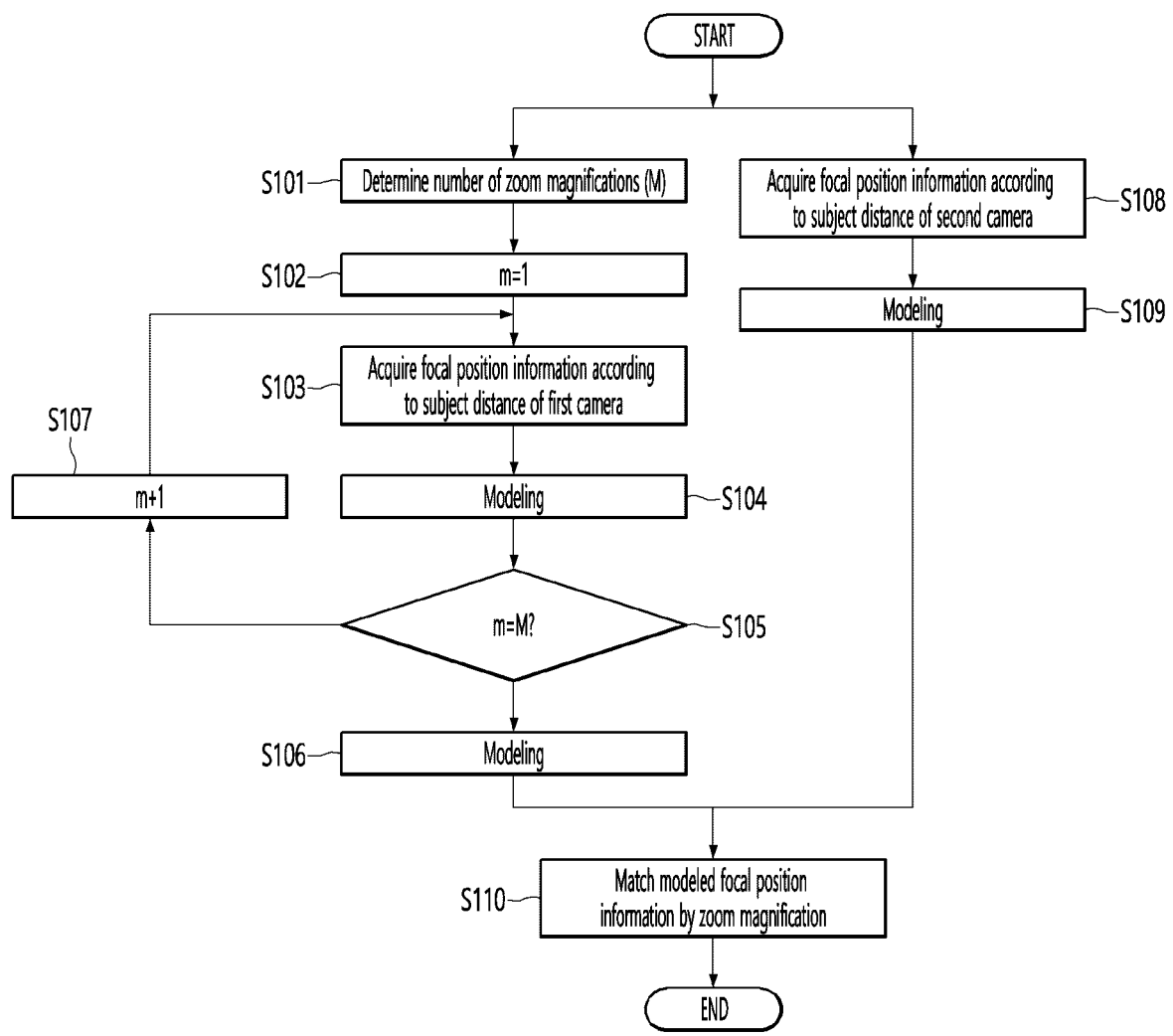
FIG. 11 is a flowchart illustrating a step-by-step method for matching location information according to the present embodiment.
Figure 12:
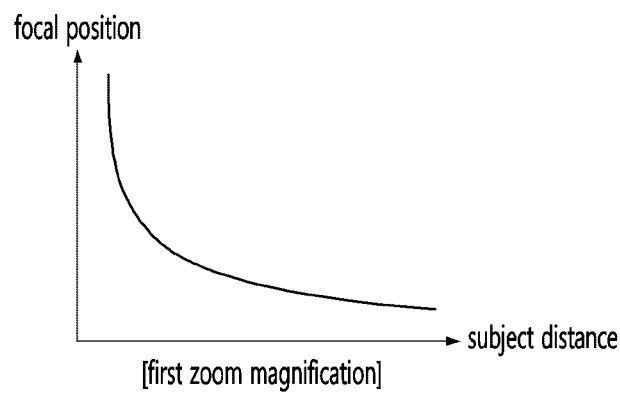
FIG. 12 is a diagram illustrating location information of a first camera modeled according to the present embodiment.
Figure 12:
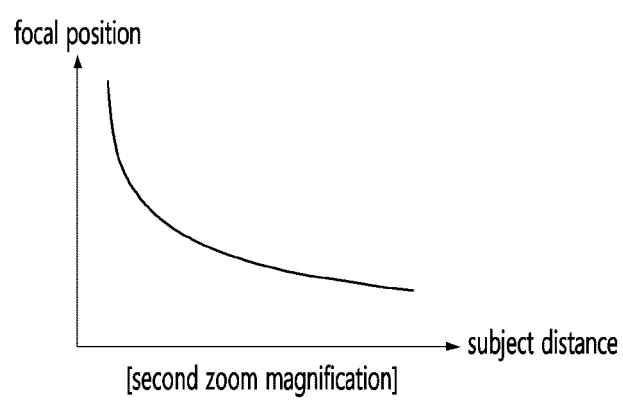
Figure 12:
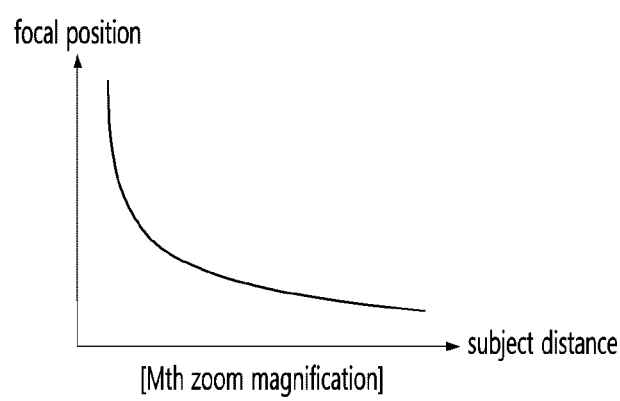
Figure 13:
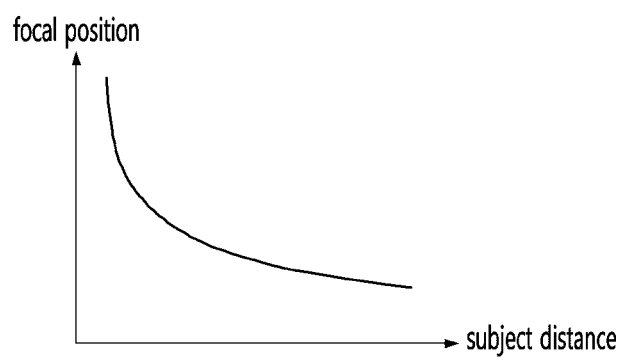
FIG. 13 is a diagram illustrating location information of a second camera modeled according to the present embodiment.
Figure 14:
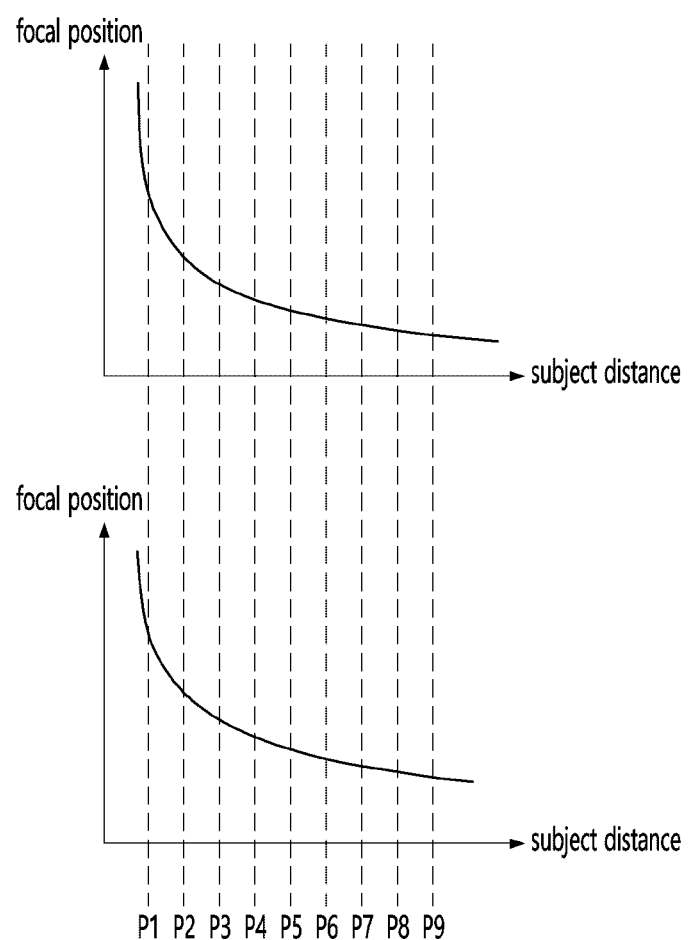
FIG. 14 is a diagram illustrating a process of matching location information of first and second cameras according to the present embodiment.

FIG. 11 is a flowchart showing step by step a method for matching location information according to an embodiment of the present invention, FIG. 12 is a diagram showing location information of a first camera unit modeled according to an embodiment of the present invention, FIG. 13 is a diagram showing location information of a second camera unit modeled according to an embodiment of the present invention, and FIG. 14 is a diagram for explaining a process of matching location information of first and second camera units according to an embodiment of the present invention.

Referring to FIG. 11, in order to match the focal positions of the first focus lens 411 and the second focus lens 421 to each other, the number of zoom magnifications to be matched (M) is firstly determined (step 101). That is, a considerable amount of time is required to perform all of the matching operations for all magnifications of the zoom lens 412 of the first camera 410. Accordingly, the matching operation may be performed on only some zoom magnifications among all magnifications, and interpolation may be performed on the other zoom magnifications based on the matched information. When the number of zoom magnifications is determined, the entire magnification of the zoom lens 412 may be divided according to the determined number of zoom magnifications. For example, when the number of zoom magnifications is determined to be four, the matching operation may be performed only for the determined four zoom magnifications, and matching operations for other zoom magnifications may be performed through interpolation.

Thereafter, the zoom magnification of the zoom lens 412 to be applied is determined based on the determined zoom magnification number M (step 102). That is, the initially determined zoom magnification (m) may be 1 magnification. Accordingly, the determined zoom magnification may be a first (eg, the lowest or highest zoom magnification) zoom magnification among a plurality of zoom magnifications divided based on the number of zoom magnifications. Hereinafter, the determined zoom magnification is referred to as a 'first zoom magnification'.

When the zoom magnification is determined, a matching operation is performed on the determined zoom magnification.

To this end, with respect to the determined first zoom magnification, information on the focal position of the first focus lens 411 is acquired for each distance of the subject (step 103). In this case, the focal position of the first focus lens 411 may proceed only for a specific point within the entire range of the subject distance.

Next, by using the information acquired in step 103, the focal position information of the first focus lens 411 with respect to the first zoom magnification is modeled (step 104). That is, the focal position information may be acquired only at a specific point, and accordingly, data for other points other than that may be interpolated using information acquired at the specific point.

Thereafter, when the modeling for the currently determined zoom magnification is completed, it is determined whether modeling for all zoom magnifications corresponding to the determined zoom magnification number has been completed (step 105). That is, it is determined whether the modeled zoom magnification (n) is equal to the determined zoom magnification number (M). For example, when the number of zoom magnifications (M) is 4, it is determined whether the modeled zoom magnification (n) is a fourth zoom magnification.

And, as a result of the determination, if modeling has not been completed for all the zoom magnifications, modeling for the next zoom magnification is performed. To this end, it is possible to determine a zoom magnification (n) to be modeled (step 106). That is, the determined zoom magnification n may be the next zoom magnification (previous zoom magnification n+1) of the previously modeled zoom magnification.

Meanwhile, the modeling operation of the position information of the first focus lens 411 of the first camera 410 may be performed together with the modeling of the second focus lens 421 of the second camera 420 for each zoom magnification.

That is, referring to FIG. 12, the modeling operation may be performed according to the determined number of zoom magnifications (M).

Accordingly, M pieces of final information after the modeling may exist corresponding to the number of zoom magnifications.

Here, the modeling may be expressed as a graph representing a focal position of the first focus lens 411 according to a subject distance.

In addition, graphs classified according to the zoom magnification may have different curves.

Meanwhile, the second camera 420 has a fixed zoom magnification. Therefore, the second camera 420 is not classified by zoom magnification, and position information of the second focus lens 421 corresponding to the distance of the subject may be acquired for only one specific zoom magnification (step 107). Also, the location information of the second focus lens 421 may not be acquired corresponding to all object distances, but may be acquired only for a specific point.

Accordingly, a modeling process of acquiring position information for other points may be performed by using the position information of the second focus lens 421 for the acquired specific point (step 108).

That is, referring to FIG. 13, the modeling operation of the second camera 420 may be performed only for a fixed specific zoom magnification. Accordingly, only one final information after modeling of the second camera may exist. Here, the modeling of the second camera 420 may be expressed as a graph indicating the focal position of the second focus lens 421 according to a subject distance.

Thereafter, the acquired position information of the first focus lens 411 and the position information of the second focus lens 421 are matched with each other (step 109). In this case, the matching may be performed for each of the zoom magnifications classified in the modeling of the first camera 410.

In other words, if the number of zoom magnifications (M) is 4, the position information of the first focus lens 411 modeled at the first zoom magnification and the position information of the second focus lens 421 are modeled, the position information of the first focus lens 411 modeled at the second zoom magnification and the position information of the second focus lens 421 are modeled, the position information of the first focus lens 411 modeled at the third zoom magnification and the position information of the second focus lens 421 are modeled, and the position information of the first focus lens 411 modeled at the fourth zoom magnification and the position information of the second focus lens 421 are modeled.

In this case, the matching may be performed only for a specific point based on an object distance.

That is, referring to FIG. 14, within the entire subject distance range, nine points (P1, P2, P3, P4, P5, P6, P7, P8, P9) may be set, position information of the first focus lens 411 and position information of the second focus lens 421 are matched with each other for each of the nine points. In other words, when the subject distance is 'A' at the first zoom ratio, the focal position of the first focus lens 411 is 'B', and the focal position of the second focus lens 421 is 'C', and the matching can be performed on a mutual relationship.

In addition, when matching is performed only for the specific point, the other points may be interpolated based on the matched information.

Meanwhile, matching information matched for each zoom magnification of the first camera 410 as described above may be firstly stored in the storage 430.

Figure 15:
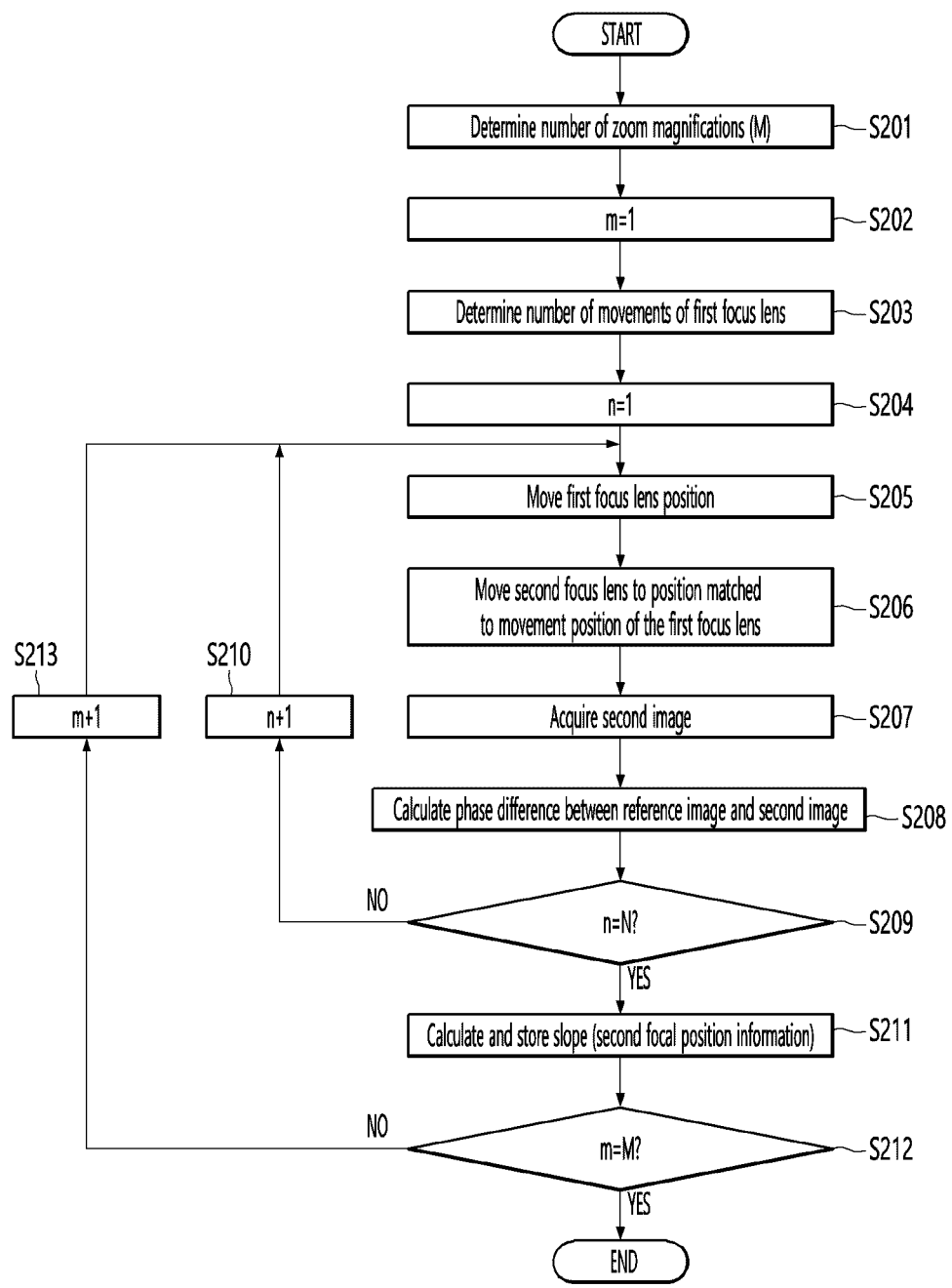
FIG. 15 is a flowchart illustrating a step-by-step method of storing second focal position information according to the present embodiment.
Figure 16:
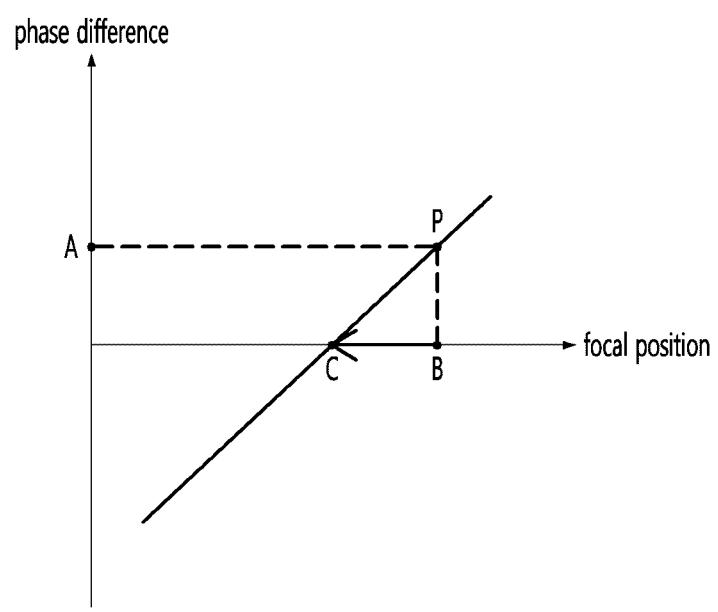
FIG. 16 is a diagram illustrating an example of second focal position information acquired according to the present embodiment.

FIG. 15 is a flowchart illustrating a step-by-step method of storing second focal position information according to an embodiment of the present invention, and FIG. 16 is a diagram illustrating an example of second focal position information acquired according to an embodiment of the present invention.

As described above, when the matching operation is completed, the focal position information of the second camera 420 for each matching point is acquired using the matched information. In other words, the phase difference between the second image captured by the second camera 420 and the reference image is checked for each matching point, and second focal position information for moving the focal position of the second focus lens 421 to the best focal position is acquired according to the phase difference.

The acquisition of the second focal position information is performed for each matching point. In this case, since the matching is performed by being divided by the zoom magnification of the first camera 410, the acquisition of the second focal position information may also be performed by being divided by the zoom magnification.

To this end, firstly, the number of zoom magnifications M of the first camera 410 is determined (step 201).

Thereafter, a zoom magnification (m) to be currently applied is determined (step 202). That is, during an initial operation, the first zoom magnification among the zoom magnifications divided by the determined number of zoom magnifications may be determined as the zoom magnification to be currently applied. That is, the zoom magnification (m) to be applied currently is set to 1, and the second focal position information acquisition process for the first zoom magnification is performed.

In addition, the second focal position information may not be acquired for all matching points within the determined zoom magnification, but may be acquired only for a plurality of partial points. Accordingly, a point at which the second focal position information is to be acquired is set. That is, the number of movements (N) of the first focus lens 411 is set (step 203). The number of movements N of the first focus lens 411 may be the number of points.

Next, when the point is set, a specific point to acquire the second focal position information is determined (step 204). That is, initially, a process of acquiring the second focal position information for a first point (eg, n=1) among the plurality of points may be performed.

To this end, the first focus lens 411 is moved to a focal position of the first focus lens 411 at the determined specific point using the matching information (step 205).

Next, the second focus lens 421 is moved to a position of the second focus lens 421 matched with the position of the first focus lens 411 (step 206).

When the second focus lens 421 is moved, the focus of the second camera 420 at the moved position may be in a correct state or an unfit state.

Accordingly, the second camera 420 acquires a second image while the second focus lens 421 is moved (step 207). In this case, if the second image is in focus, there will be no phase difference from the reference image (ie, the phase difference of the second image is 0), otherwise, a phase difference will occur.

Then, when the second image is acquired, a phase difference with respect to the acquired second image is calculated (step 208). The phase difference of the second image may be a difference from the reference image having a phase of 0.

Next, it is determined whether or not the phase difference has been confirmed for all the set points (step 209).

As a result of the determination, if the phase difference for all points is not confirmed, the operation of moving to the next point is performed, and the phase difference of the second image acquired from the second camera 420 is calculated at the next point (step 210).

In addition, when the phase difference of the second image for all the points is calculated, the second phase differences are connected and a slope corresponding thereto is calculated (step 211). When the slope is calculated, the calculated slope is stored, and the stored slope becomes second focal position information for moving the focal position of the second focus lens 421.

In other words, when the second image is in focus, the amount of defocus is zero. Accordingly, the second focal position information may be focal position information of the second focus lens 421 for making the amount of defocus detected from each phase difference to be zero.

The second focal position information may be as shown in FIG. 16.

Referring to FIG. 16, the second focal position information will be described. The second focal position information includes the focal position information of the second focus lens 421 with respect to the phase difference of the second image. In this case, the focal position of the second focus lens 421 may mean a defocus amount. Here, the defocus amount is a numerical value indicating the degree of shift in focus, but in the auto focus function, it may be used as a physical quantity indicating how far away from the current focus position of the second focus lens 421 to the best focal position. That is, in FIG. 16, the amount of defocus expressed as the position of the second focus lens 421 may represent a distance and direction from the current focal position of the second focus lens 421 to the best position. Here, if the movement amount of the focal position of the second focus lens 421 is expressed in μm units, the unit of the defocus amount may also be in μm units.

That is, the X axis in FIG. 16 may indicate the position of the second focus lens 421, and the Y axis may indicate the phase difference of the second image. In this case, the X-axis may substantially mean a defocus amount. At this time, the phase difference and the amount of defocus ideally have a linear relationship. Accordingly, it is possible to calculate the slope of the straight line having the linear relationship with the phase difference acquired from a plurality of points as described above. In this case, a coefficient for converting (converting) the phase difference into a defocus amount is also referred to as a conversion coefficient, and the defocus amount can be acquired by the following equation (1).

$$\text{Defocus amount}[\mu m] = \text{phase difference}[\text{number of pixels}] * \text{conversion factor}(a)[\mu m/\text{number of pixels}] \quad [\text{Equation 1}]$$

Here, the relationship between the phase difference and the amount of defocus is ideally represented by a straight line. Accordingly, when the X-axis is the defocus amount or the position of the second focus lens 421 and the Y-axis is the phase difference, the conversion coefficient in the two-dimensional plane represents the slope of the conversion characteristic represented by a straight line.

For example, if the phase difference of the second image is 'A', and the focal position at point 'P' calculated based on the slope is 'B', and the best position is 'C', the second focal position information may mean that accurate focus is achieved only when the second focus lens is moved with a movement amount corresponding to a distance from B to C when there is a phase difference corresponding to A.

Acquiring information for moving the focal position to the best position by using the phase difference as described above is a general PDAF function, and thus a detailed description thereof will be omitted.

As described above, when the second focal position information for a specific zoom magnification is acquired, it is determined whether the second focal position information has been acquired for all zoom magnifications (step 212).

And, if the second focal position information has not been acquired for all the zoom magnifications, a next zoom magnification (m+1) is set, and the second focal position information acquisition process for the set next zoom magnification is continually performed (step 213).

Figure 17:
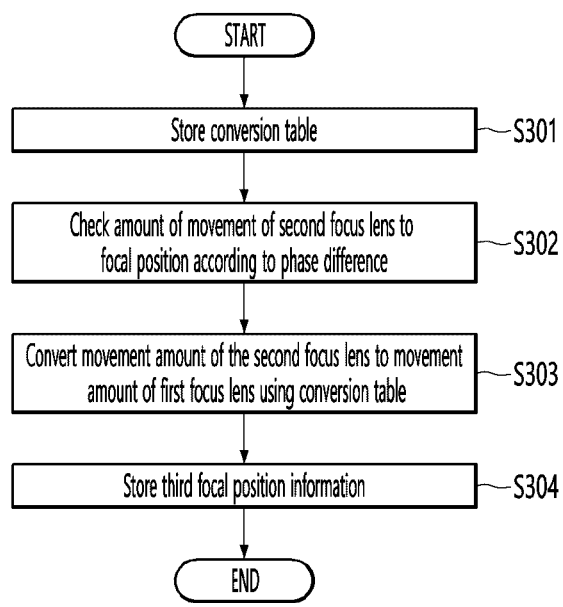
FIG. 17 is a flowchart illustrating a step-by-step method of storing third focal position information according to the present embodiment.
Figure 18:
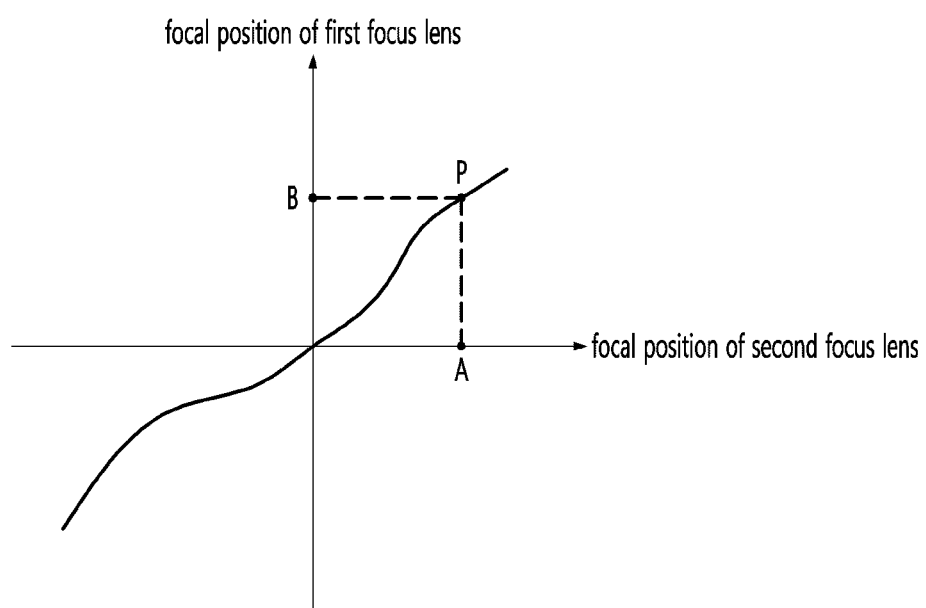
FIG. 18 is a diagram illustrating an example of third focal position information acquired according to the present embodiment.

FIG. 17 is a flowchart illustrating a step-by-step method of storing third focal position information according to an embodiment of the present invention, and FIG. 18 is a diagram illustrating an example of third focal position information acquired according to an embodiment of the present invention.

In this case, the second focal position information corresponding to the focal position of the second focus lens 421 at the matching point cannot be directly utilized as control information of the first focus lens 411. This is because the stroke-like characteristics of the first and second focus lenses 411 and 421 are different from each other. Accordingly, information for moving the focal position of the first focus lens 411 must be acquired using the second focal position information to correspond to the moving position of the second focus lens 421.

To this end, firstly, a conversion table for the relationship between the first focus lens 411 and the second focus lens 421 is stored (step 301). The conversion table may be acquired in a design or manufacturing step of the first and second focus lenses 411 and 421. For example, when moving the second focus lens 421 by '3', the conversion table may be information indicating that the moving distance of the first focus lens 411 corresponding thereto is '2' instead of '3'.

Then, position information of the second focus lens 421 according to the phase difference included in the second focal position information is checked (step 302). That is, the amount of defocus or the amount of movement of the second focus lens 421 according to the phase difference included in the second focal position information is checked.

Subsequently, information on the movement amount of the first focus lens 411 corresponding to the checked movement amount of the second focus lens 421 is extracted from the conversion table (step 303).

Accordingly, third focal position information consisting of a movement amount (focal movement position) of the second focus lens 411 and a movement amount (focal movement position) of the first focus lens 411 corresponding thereto is acquired and stored. (Step 304).

That is, the third focal position information is information for determining a focal movement position of the first camera 410 by using information of the second camera 420. In other words, the third focal position information may be information on a focal movement position of the first focus lens 411 corresponding to a focal movement position of the second focus lens 421 when the focal position of the second focus lens 421 is moved as the shooting condition of the camera is changed.

Figure 19:
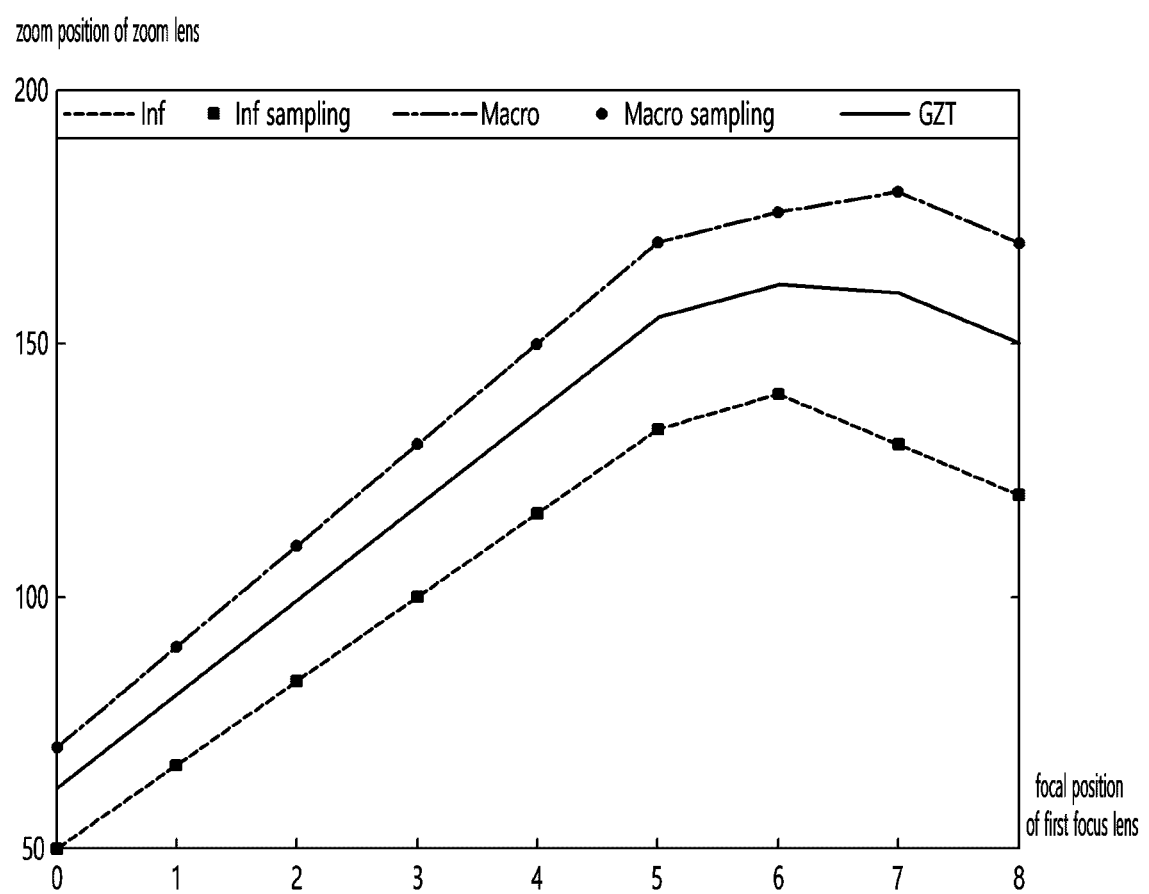
FIG. 19 is a diagram illustrating an example of first focal position information according to the present embodiment.

FIG. 19 is a diagram illustrating an example of first focal position information according to an embodiment of the present invention.

Meanwhile, the first camera 410 basically performs an auto focus function using first focal position information.

Referring to FIG. 19, the first focal position information includes zoom position information of the zoom lens 412 and focal position information of the first focus lens 411 according to a distance (Macro, Infinity, etc.) to a subject. This can be expressed as a trace curve. The trace curve may include a first trace curve for infinity, a second trace curve for a macro, and at least one third trace curve for a specific distance between the infinity and the macro.

In addition, the first camera 410 may implement an auto focus function based on the first focal position information.

Figure 20:
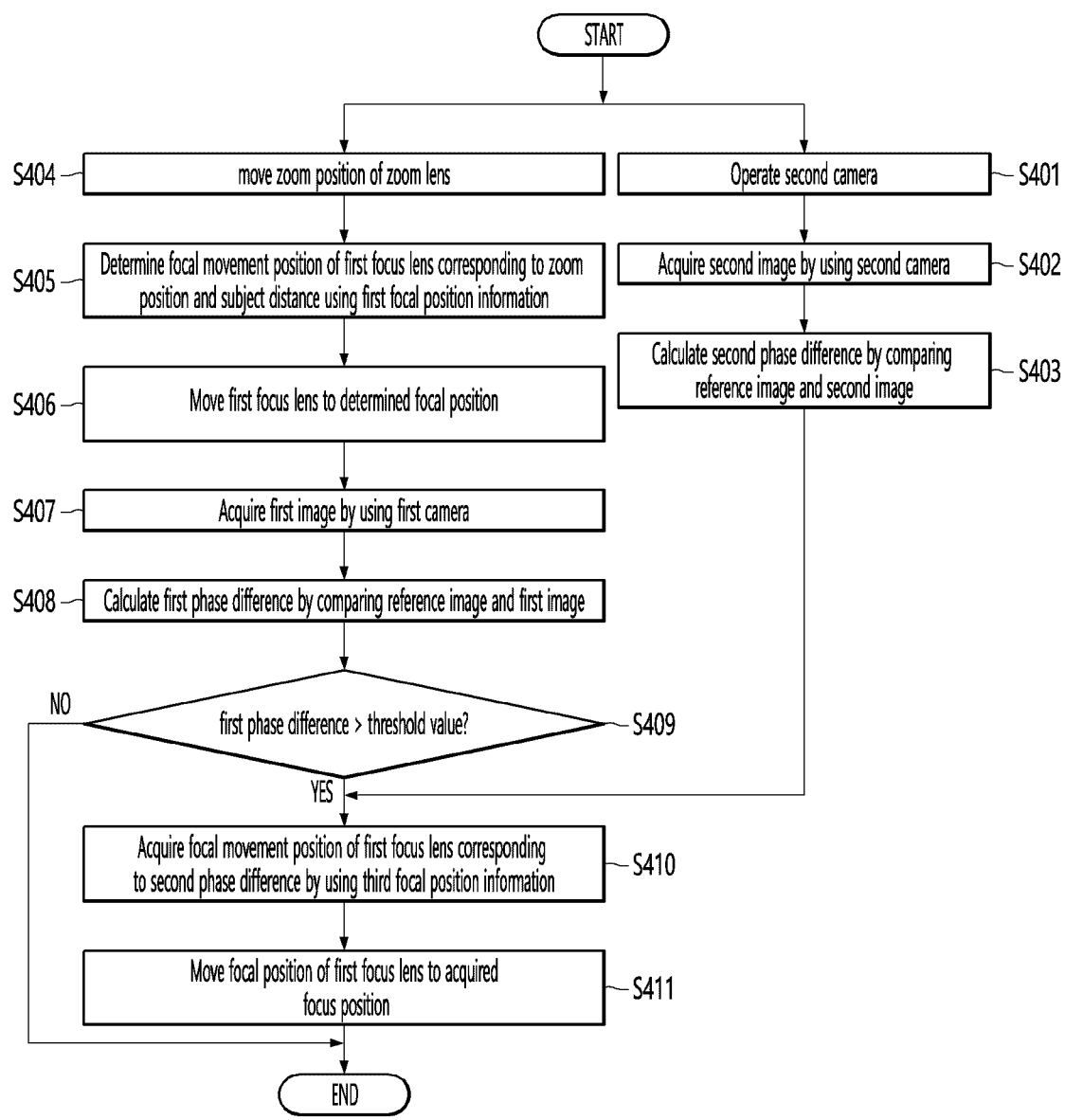
FIG. 20 is a flowchart for explaining step-by-step a method of operating the camera module according to the present embodiment.

FIG. 20 is a flowchart for explaining step by step a method of operating a camera module according to an embodiment of the present invention.

Referring to FIG. 20, the second camera 420 starts an operation when an operation start event occurs (step 401). In this case, the operation start event may generally be a case in which an operation command of the second camera 410 is input from the outside. Alternatively, the operation start event may be a case where a shooting condition is changed during the operation of the first camera 410. To this end, the controller 440 may check whether the operation start event has occurred, and control the operation of the second camera 420 to be started. That is, the controller 440 may detect a situation in which a subject to be photographed by the first camera 410 is changed, or the distance to the subject is changed, or the zoom magnification of the first camera 410 is changed, or the location of the camera module itself is moved, and cause the operation of the second camera 410 to start as the situation is detected. In addition, the controller 440 may cause the second camera 420 to operate when a video is captured through the first camera 410. That is, when a moving picture is captured by the first camera 410, the response speed of the first focus lens 411 may not be able to keep up with the moving subject, so the controller 440 may cause the second camera 420 to operate in the background in order to accurately and quickly determine the focal position of the first camera 410.

In addition, the second camera 420 may acquire a second image according to a control signal from the controller 440 (step 402).

The second image may be a second phase difference image acquired through a second image sensor 423 included in the second camera 420. In this case, the second image may be photographed based on an operating condition of the first camera 410. For example, the controller 440 may acquire the focal position of the second focus lens 421 matched to correspond to the zoom magnification of the first camera 410 and the focal position of the first focus lens 411. And, when the focal position of the second focus lens 421 is acquired, the controller 440 may control the second image to be acquired after the second focus lens 421 is moved to the acquired focal position.

Thereafter, when the second image is acquired, the controller 440 compares the reference image and the acquired second image, and calculates a second phase difference (step 403). In this case, when the second phase difference is calculated, the controller 440 determines a focal movement position of the second focus lens 421 corresponding to the second phase difference, using the second focal position information, and the causes the second focus lens 421 to move to the determined focal movement position. Alternatively, when the second phase difference is calculated, the controller 440 may store only the calculated second phase difference information.

Meanwhile, the controller 440 moves the zoom position of the zoom lens 412 at a zoom magnification according to the user's setting (step 404).

Thereafter, the controller 440 determines the focal position of the first focus lens 411 based on the zoom magnification and the distance to the subject to be photographed, using the first focal position information stored in the storage 430 (step 405).

In addition, when the focal position is determined, the controller 440 controls the first focus lens 411 to move to the determined focal position (step 406). Accordingly, the first focus lens driver 413 moves the first focus lens 411 to the determined focal position according to a control signal from the controller 440. In this case, as described above, the first focus lens 411 may move its physical position, and differently, the curvature of the interface may change.

Thereafter, the first camera 410 acquires a first image (step 407). The first image may be a first phase difference image acquired through a first image sensor 415 constituting the first camera 410.

Next, when the first image is acquired, the control 440 compares the reference image and the first image, and calculates a first phase difference for the first image (step 408). In this case, the first phase difference will have a value close to 0 when the determined focal position of the first focus lens 411 is correct.

Thereafter, when the first phase difference is calculated, the controller 440 compares the first phase difference with a preset threshold (step 409).

Here, the threshold value may be determined according to the characteristics of the first focus lens 411. In other words, the threshold value may be determined according to a Modulation Transfer Function (MTF) of the first focus lens 411.

The MTF may be expressed as a curve, which is one of the criteria for evaluating lens performance, and indicates how faithfully the contrast of the subject can be reproduced on the image surface (a screen in which light is illuminated) as a spatial frequency characteristic. In the MTF curve, the horizontal axis represents the lens field (the distance from the center of the screen to the edge), and the vertical axis represents the contrast value (the maximum value is 1). In addition, if the slope of the MTF curve is large, even when the focal position is slightly shifted from the best position, the captured image may not be in focus. In addition, if the slope of the MTF curve is small, the captured image may be in focus even when the focal position is slightly shifted within a predetermined range based on the best position. Accordingly, the threshold value may be set with an MTF curve indicating the performance of the first focus lens 411. That is, when the slope of the MTF curve is large due to poor performance of the first focus lens 411, the threshold value may be set to a first value close to zero. In addition, when the slope of the MTF curve is small as the performance of the first focus lens 411 is good, the threshold value may be set to a second value greater than the first value.

In this case, when the first phase difference is less than or equal to the threshold value, the controller 440 maintains the current focal position of the first focus lens 411 (step 409). That is, when the first phase difference is less than the threshold value, it means that the first image is in focus, and accordingly, the controller 440 keeps the current focal position.

In contrast, when the first phase difference is greater than the threshold value, the controller 440 recognizes that the accuracy of the current focal position of the first focus lens 411 is low, and re-determines the focal position of the first focus lens 411.

To this end, the controller 440 acquires a focal movement position of the second focus lens 421 corresponding to a second phase difference of the second image captured through the second camera 410. That is, the controller 440 acquires a focal movement position of the second focus lens 421 corresponding to the calculated second phase difference from the previously stored second focal position information.

Thereafter, the controller 440 re-determines the focal movement position of the first focus lens 411 corresponding to the focal movement position of the second focus lens 421 from the third focal position information stored in the storage 430. (Step 410).

Further, the controller 440 re-moves the focal position of the first focus lens 411 to the re-determined focal position of the first focus lens 411 (step 411).

In this case, the controller 440 may update the first focal position information stored in the storage 430 based on the re-determined focal movement position of the first focus lens 411.

That is, when the first phase difference of the first image is greater than the threshold value, it means that the focal position of the first focus lens 411 set to acquire the first image among the first focal position information is not accurate. Accordingly, when the first image is retaken at a corresponding point in the future, an accurate focal position of the first camera 410 cannot be determined using the first focal position information. Accordingly, the controller 440 updates the first focal position information stored in the storage 430 based on the re-determined focal position of the first focus lens 411. Accordingly, when the first image is later retaken at the corresponding point, since the updated information is used, the accuracy of the focus of the first image can be improved.

In the present embodiment, in a camera module including the first and second cameras, focal position information of the first camera and focal position information of the second camera are matched with each other. Further, when the first camera is automatically focused, the accuracy of the current focal position of the first camera is determined based on the phase difference of the image acquired through the first camera. Thereafter, when the accuracy of the current focal position of the first camera is low, the correct focal position of the first camera is tracked by using the focal position information of the second camera according to the matching. As described above, in the embodiment according to the present invention, when implementing the auto focus function of the first camera, not only zoom tracking of the first camera but also the focal movement position is tracked using the focal position information of the second camera, and accordingly, accuracy can be improved.

In addition, in the present embodiment, an operation for increasing the focal position accuracy of the first camera is performed by the second camera only when the zoom magnification of the first camera is changed. Accordingly, in an embodiment according to the present invention, it is possible to minimize the amount of power consumed by the operation of the second camera.

In addition, in the present embodiment, when the focal position information of the first camera is incorrect at a specific point, the focal position information of the first camera for the specific point is updated using the focal position information of the second camera. Accordingly, in an embodiment according to the present invention, it is possible to improve the accuracy of the focal position without being affected by a change in characteristics of an actuator that changes according to the number of times or time of use of the camera module.

Figure 21:
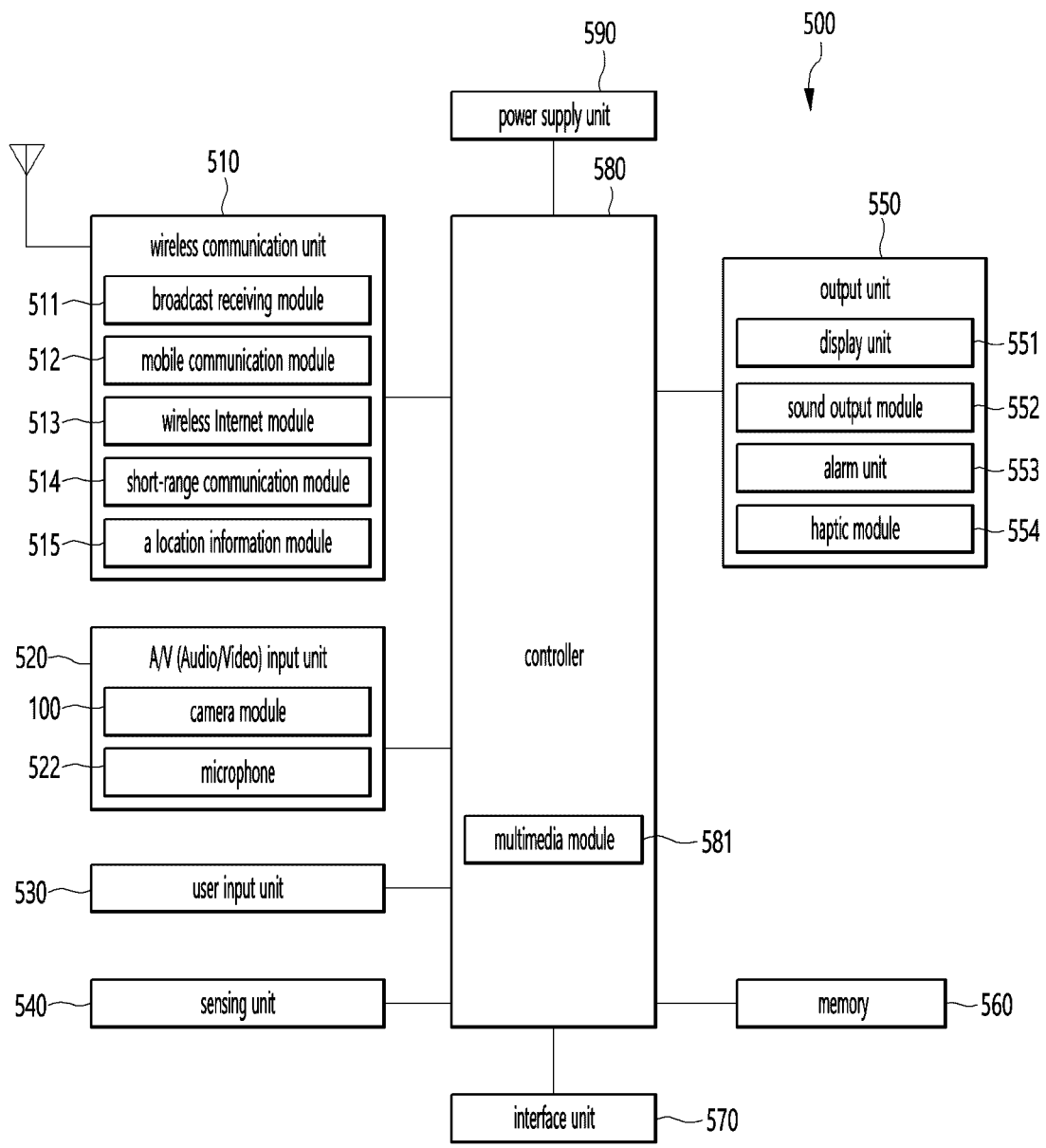
FIG. 21 is a diagram showing the configuration of a mobile terminal including a camera module according to the present embodiment.

FIG. 21 is a diagram showing the configuration of a mobile terminal including a camera module according to an embodiment of the present invention.

The camera module as described above may be mounted on an optical device. Preferably, the camera module may be mounted in the mobile terminal. In this case, in the camera module itself, the focal position of the first camera 410 may be determined by using the focal position information of the second camera 420. Also, differently, the first camera 410 determines a focal position using the first focal position information, and the second camera 410 determines a focal position using the second focal position information. The second camera unit 410 determines a focal position using the second focal position information. In addition, the main controller in the mobile terminal may determine the accuracy of the focal position of the first camera, and accordingly, output a focal position change signal of the first camera 410 based on the third focal position information.

In other words, in another embodiment of the present invention, an operation of determining a focal movement position of the first camera 410 using a focal movement position of the second focus lens 421 of the second camera 420 may be performed within a terminal other than the camera module.

The mobile terminal 500 may include a wireless communication unit 510, an audio/video (A/V) input unit 520, a user input unit 530, a sensing unit 540, an output unit 550, a memory 560, and an interface unit 570, a controller 580, a power supply unit 590, and the like. Since the components shown in FIG. 21 are not essential, a mobile terminal having more components or fewer components may be implemented.

Hereinafter, the components will be sequentially described.

The wireless communication unit 510 may include one or more modules that enable wireless communication between the mobile terminal 500 and a wireless communication system or between the mobile terminal 500 and a network in which the mobile terminal 500 is located. For example, the wireless communication unit 510 may include a broadcast receiving module 511, a mobile communication module 512, a wireless Internet module 513, a short-range communication module 514, and a location information module 515.

The A/V (Audio/Video) input unit 520 is for inputting an audio signal or a video signal, and may include the previously described camera module 100. Further, the A/V (Audio/Video) input unit 520 may include a microphone 122 or the like. The camera module 100 processes an image frame such as a still image or a video acquired by an image sensor in a video call mode or a photographing mode of a terminal. The processed image frame may be displayed on the display unit 551.

The image frames processed by the camera module 100 may be stored in the memory 560 or transmitted to the outside through the wireless communication unit 510.

The user input unit 530 generates input data for the user to control the operation of the terminal. The user input unit 530 may be composed of a key pad, a dome switch, a touch pad (positive pressure/electrostatic), a jog wheel, a jog switch, and the like.

The sensing unit 540 detects the current state of the mobile terminal 500 such as the open/closed state of the mobile terminal 500, the location of the mobile terminal 500, the presence of user contact, the orientation of the mobile terminal, acceleration/deceleration of the mobile terminal, and generates a sensing signal for controlling the operation of the mobile terminal. For example, when the mobile terminal 500 is in the form of a slide phone, it is possible to sense whether the slide phone is opened or closed. Also, whether the power supply unit 590 supplies power or whether the interface unit 570 is coupled to an external device may be sensed. Meanwhile, the sensing unit 540 may include a proximity sensor 541.

The output unit 550 is for generating an output related to visual, auditory or tactile sense, and may include a display unit 551, a sound output module 552, an alarm unit 553, and a haptic module 554.

The display unit 551 displays (outputs) information processed by the mobile terminal 500. The display unit 551 includes a liquid crystal display (LCD), a thin film transistor-liquid crystal display (TFT LCD), an organic light-emitting diode (OLED), and a flexible display. display) and a 3D display.

The memory 560 may store a program for the operation of the controller 580 and may temporarily store input/output data (eg, phonebook, message, still image, video, etc.). Preferably, the third focal position information described above may be stored in the memory 560.

The memory 560 may include a storage medium of at least one type of flash memory type, hard disk type, SSD type (Solid State Disk type), SDD type (Silicon Disk Drive type), multimedia card micro type, card type memory (eg, SD or XD memory, etc.), random access memory (RAM), static random access memory (SRAM), read-only memory (ROM), electrically erasable programmable read-only memory (EEPROM), programmable read-only memory (PROM), magnetic memory, magnetic disk, and optical disk based on hardware. The mobile terminal 500 may operate in connection with a web storage that performs a storage function of the memory 560 over the Internet.

The interface unit 570 serves as a passage for all external devices connected to the mobile terminal 500. The interface unit 570 receives data from an external device or receives power and transmits the data to each component inside the mobile terminal 500, or transmits data inside the mobile terminal 500 to an external device. For example, a wired/wireless headset port, an external charger port, a wired/wireless data port, a memory card port, a port for connecting a device equipped with an identification module, an audio input/output (I/O) port, A video input/output (I/O) port, an earphone port, and the like may be included in the interface unit 570.

The controller 580 generally controls the overall operation of the mobile terminal. For example, it performs related control and processing for voice calls, data communication, and video calls. The controller 580 may also include a multimedia module 581 for playing multimedia. The multimedia module 581 may be implemented in the controller 580 or may be implemented separately from the controller 580.

On the other hand, the camera module according to the first embodiment of the present invention stores all the first to third focal position information, and accordingly the focal movement position of the first focus lens 411 is determined using the focal movement position of the second focus lens 421 of the second camera 420.

In this case, the controller 440 provided in the camera module controls the operation of the first camera 410 and controls the operation of the second camera 420, and acquires information to be used for determining the position of the focal movement. As described above, the controller 440 of the camera module in the first embodiment simultaneously controls the first and second cameras, and accordingly, the speed of acquiring information may be relatively slow.

In other words, the controller 440 has determined a focus movement position of the second focus lens 421 corresponding to the second phase difference and a focus movement position of the first focus lens 411 corresponding to the focus position, after the time when it is confirmed that the first phase difference is greater than the threshold value. Accordingly, there may be a problem that the first image having the first phase difference is provided to the user for a predetermined time.

Therefore, in the second embodiment of the present invention, the controller 580 of the terminal determines the focal movement position of the first focus lens 411 corresponding to the focal movement position of the second focus lens 421 in the background, and provides to the controller 440 of the camera module according to whether the determined focal position is required.

That is, in the second embodiment of the present invention, the second phase difference acquired through the second camera unit 420 as described above is calculated by the controller 580 that is the main control unit of the terminal. Accordingly, the controller 580 acquires the focal movement position of the first focus lens 411 according to the focal movement position of the second focus lens 421 of the second camera 420 in advance.

Accordingly, it is possible to accurately focus the first camera in a faster time, thereby improving user satisfaction.

The power supply unit 190 receives external power and internal power under the control of the controller 180 and supplies power necessary for the operation of each component.

Various embodiments described herein may be implemented in a recording medium that can be read by a computer or a similar device using, for example, software, hardware, or a combination thereof.

According to hardware implementation, the embodiments described herein may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units for performing other functions. In some cases, such embodiments may be implemented by the controller 180.

According to the software implementation, embodiments such as procedures or functions may be implemented together with separate software modules that perform at least one function or operation. The software code can be implemented by a software application written in an appropriate programming language. The software code is stored in the memory 560 and can be executed by the controller 580.

In the present embodiment, in a camera module including the first and second cameras, focal position information of the first camera and focal position information of the second camera are matched with each other. Further, when the first camera is automatically focused, the accuracy of the current focal position of the first camera is determined based on the phase difference of the image acquired through the first camera. Thereafter, when the accuracy of the current focal position of the first camera is low, the correct focal position of the first camera is tracked by using the focal position information of the second camera according to the matching. As described above, in the embodiment according to the present invention, when implementing the auto focus function of the first camera, not only zoom tracking of the first camera but also the focal movement position is tracked using the focal position information of the second camera, and accordingly, accuracy can be improved.

In addition, in the present embodiment, an operation for increasing the focal position accuracy of the first camera is performed by the second camera only when the zoom magnification of the first camera is changed. Accordingly, in an embodiment according to the present invention, it is possible to minimize the amount of power consumed by the operation of the second camera.

In addition, in the present embodiment, when the focal position information of the first camera is incorrect at a specific point, the focal position information of the first camera for the specific point is updated using the focal position information of the second camera. Accordingly, in an embodiment according to the present invention, it is possible to improve the accuracy of the focus position without being affected by a change in characteristics of an actuator that changes according to the number of times or time of use of the camera module.

The invention claimed is:

1. A method of operating a camera device, comprising:
   detecting a first phase difference by comparing a reference image and a first image acquired by a first camera;
   detecting a second phase difference by comparing the reference image and a second image acquired by a second camera; and
   determining a focal movement position of a second focus lens of the second camera by using the second phase difference,
   wherein when the first phase difference is greater than or equal to a preset threshold, determining a focal movement position of a first focus lens of the first camera by using the focal movement position of the second focus lens of the second camera.

2. The method of claim 1, wherein the focal movement position of the first focus lens or the second focus lens is a movement distance of the first or second focus lens or a change in curvature of the first or second focus lens.

3. The method of claim 1, wherein at least one of the first and second focus lenses includes a liquid lens.

4. The method of claim 1, wherein the focal movement position of the first focus lens is determined based on a relationship between the focal movement position of the second focus lens and the focal movement position of the first focus lens.

5. The method of claim 4, wherein the determining of the focal movement position of the first focus lens includes:
   acquiring the focal movement position of the first focus lens corresponding to the focal movement position of the second focus lens from a pre-stored compensation table; and
   determining the acquired focal movement position as the focal movement position of the first focus lens, and
   wherein the compensation table includes:
   a focal movement position of the second focus lens to be applied for each phase difference of the second image; and
   a focal movement position of the first focus lens corresponding to a focal movement position of the second focus lens determined based on the relationship.

6. The method of claim 1, wherein the reference image is an image having a phase difference of 0 acquired at the best focal position of the first or second focus lens.

7. The method of claim 1, further comprising:
   determining a zoom position of a zoom lens of the first camera and a focal position of the first focus lens before the first image is acquired,
   wherein the zoom position of the zoom lens and the focal position of the first focus lens are determined based on the zoom position of the zoom lens divided according to a distance to a subject and first focal position information of the first focus lens corresponding to the zoom position.

8. The method of claim 7, further comprising:
   wherein when the first phase difference is less than the threshold value, maintaining the focal position of the first focus lens determined based on the first focal position information.

9. The method of claim 1, wherein at least one of the first and second images is a moving picture including a plurality of frames.

10. A camera device, comprising:
    a first camera including a first focus lens and configured to acquire a first image;
    a second camera including a second focus lens and configured to acquire a second image; and
    a controller configured to detect a first phase difference between a reference image and the first image and a second phase difference between the reference image and the second image,
    wherein the controller is configured to:
    determine a focal movement position of the second focus lens of the second camera by using the second phase difference; and
    determine a focal movement position of the first focus lens of the first camera using the focal movement position of the second focus lens of the second camera when the first phase difference is greater than or equal to a preset threshold.

11. The camera device of claim 10, wherein the first camera includes a zoom lens,
    wherein the first camera is configured to acquire the first image having the first phase difference different from the reference image through the first focus lens,
    wherein the second camera is configured to acquire the second image having the second phase difference different from the reference image through the second focus lens, and
    wherein the controller is configured to:
    calculate the first phase difference and the second phase difference;

compare the first phase difference and a preset threshold; and determine the focal movement position of the second focus lens by using the second phase difference.

12. The camera device of claim 10, wherein the focal movement position of the second focus lens is a movement distance of the second lens or a change in curvature of the second focus lens.

13. The camera device of claim 10, wherein at least one of the first and second focus lenses includes a liquid lens.

14. The camera device of claim 10, wherein the focal movement position of the first focus lens is determined based on a relationship between the focal movement position of the second focus lens and the focal movement position of the first focus lens.

15. The camera device of claim 14, further comprising:

a storage configured to store a compensation table for a focal movement position of the first focus lens corresponding to a focal movement position of the second focus lens, wherein the compensation table includes:

a focal movement position of the second focus lens to be applied for each phase difference of the second image; and a focal movement position of the first focus lens corresponding to a focal movement position of the second focus lens determined based on the relationship, and wherein the controller is configured to:

acquire the focal movement position of the first focus lens corresponding to the focal movement position of the second focus lens from the stored compensation table; and determine the acquired focal movement position as the focal movement position of the first focus lens.

16. The camera device of claim 10, wherein the reference image is an image having a phase difference of 0 acquired at a best focal position of the first or second focus lens.

17. The camera device of claim 10, wherein the first camera includes a zoom lens, wherein the controller is configured to determine a zoom position of the zoom lens of the first camera and a focal position of the first focus lens before the first image is acquired, and wherein the zoom position of the zoom lens and the focal position of the first focus lens are determined based on the zoom position of the zoom lens divided according to a distance to a subject and first focal position information of the first focus lens corresponding to the zoom position.

18. The camera device of claim 17, wherein the controller is configured to maintain the focal position of the first focus lens determined based on the first focal position information when the first phase difference is less than the threshold value.

19. The camera device of claim 10, wherein at least one of the first and second images is a moving picture including a plurality of frames.

20. The camera device of claim 11, wherein the controller is configured to:

receive from a set, a focal movement position of the first focus lens determined based on the focal movement position of the second focus lens from a set when the first phase difference is greater than or equal to the threshold value; and move the first focus lens to the received focal movement position.

* * * * *